(12) United States Patent
Uenodan et al.

(10) Patent No.: US 11,499,854 B2
(45) Date of Patent: Nov. 15, 2022

(54) PHYSICAL-QUANTITY DETECTION DEVICE

(71) Applicant: Hitachi Astemo, Ltd., Hitachinaka (JP)

(72) Inventors: Akira Uenodan, Hitachinaka (JP); Satoshi Noda, Hitachinaka (JP); Naoki Saito, Hitachinaka (JP); Masamichi Nakamura, Tokyo (JP); Takahiro Miki, Hitachinaka (JP); Nobuaki Gorai, Hitachinaka (JP); Takayuki Ishikawa, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/422,795

(22) PCT Filed: Jan. 23, 2020

(86) PCT No.: PCT/JP2020/002248
§ 371 (c)(1),
(2) Date: Jul. 14, 2021

(87) PCT Pub. No.: WO2020/202722
PCT Pub. Date: Oct. 8, 2020

(65) Prior Publication Data
US 2022/0128389 A1 Apr. 28, 2022

(30) Foreign Application Priority Data
Mar. 29, 2019 (JP) ................ JP2019-068755

(51) Int. Cl.
*G01F 1/684* (2006.01)
(52) U.S. Cl.
CPC ............ *G01F 1/684* (2013.01); *G01F 1/6842* (2013.01)
(58) Field of Classification Search
CPC ................. G01F 1/684; G01F 1/6842
See application file for complete search history.

(56) References Cited

U.S. PATENT DOCUMENTS

2013/0192388 A1  8/2013  Kono et al.
2015/0168192 A1*  6/2015  Morino ............. G01F 5/00
                                                    73/202.5
(Continued)

FOREIGN PATENT DOCUMENTS

CN  104364616 A  *  2/2015  ........... F02D 41/187
CN  104395707 A  *  3/2015  ............... G01F 1/68
(Continued)

OTHER PUBLICATIONS

International Search Report (PCT/ISA/210) issued in PCT Application No. PCT/JP2020/002248 dated Apr. 7, 2020 with English translation (four (4) pages).

(Continued)

*Primary Examiner* — Ryan D Walsh
(74) *Attorney, Agent, or Firm* — Crowell & Moring LLP

(57) ABSTRACT

Provided is a physical quantity detection device capable of improving noise performance of a flow rate detection unit as compared with the related art. The physical quantity detection device 20 includes a plate-like chip package 208 that is arranged to protrude from the flow path of the measurement target gas and has a width W along the flow direction of the measurement target gas. The chip package 208 includes a flow rate detection unit 205, an accelerating flow path 208c, a measurement surface 208a, a non-measurement surface 208b, and a separation flow portion 208d. The cross sectional area of the accelerating flow path 208c is reduced, and the flow rate detection unit 205 is arranged. The separation flow portion 208d partitions the second sub-passage 234b into a measurement flow path facing the measurement surface 208a and a non-measurement flow path facing the non-measurement surface 208b. In the width direction Dw of the chip package 208, the end portion 208ce of the (Continued)

accelerating flow path 208*c* and the end portion 208*de* of the separation flow portion 208*d* are separated from each other.

12 Claims, 37 Drawing Sheets

(56) References Cited

U.S. PATENT DOCUMENTS

| | | |
|---|---|---|
| 2015/0355006 A1 | 12/2015 | Tashiro et al. |
| 2022/0128389 A1* | 4/2022 | Uenodan ............... G01F 1/684 |

FOREIGN PATENT DOCUMENTS

| | | | | |
|---|---|---|---|---|
| DE | 112019000696 T5 | * | 10/2020 | ............. G01F 1/684 |
| DE | 112019000700 T5 | * | 11/2020 | ............... G01F 1/69 |
| EP | 3 680 630 A1 | | 7/2020 | |
| JP | 2009-036639 A | | 2/2009 | |
| JP | 2014-1973 A | | 1/2014 | |
| JP | 2017-150829 A | | 8/2017 | |
| WO | WO 2012/049934 A1 | | 4/2012 | |
| WO | WO-2014148111 A1 | * | 9/2014 | ........... G01F 1/6842 |
| WO | WO 2019/049513 A1 | | 3/2019 | |
| WO | WO-2020202722 A1 | * | 10/2020 | ............. G01F 1/684 |
| WO | WO-2020217914 A1 | * | 10/2020 | |

OTHER PUBLICATIONS

Japanese-language Written Opinion (PCT/ISA/237) issued in PCT Application No. PCT/JP2020/002248 dated Apr. 7, 2020 (three (3) pages).

Japanese-language Office Action issued in Japanese Application No. 2021-511134 dated Apr. 20, 2022 with English translation (10 pages).

* cited by examiner

PHYSICAL-QUANTITY DETECTION DEVICE

TECHNICAL FIELD

The present disclosure relates to a physical quantity detection device.

BACKGROUND ART

Conventionally, an invention related to a thermal flowmeter is known (see PTL 1 below). This conventional thermal flowmeter includes a circuit package and a housing on which the circuit package is mounted. In this circuit package, a lead frame and a circuit component mounted on the lead frame are integrally molded with a resin material. In addition, the circuit package includes a flow path exposing unit that is arranged to be exposed to a place through which the measurement target gas passes, and a flow rate detection unit that is provided in the flow path exposing unit and detects a flow rate of the measurement target gas. In this conventional thermal flowmeter, a conductive portion electrically connected to the lead frame is provided in at least a part of the flow path exposed portion (refer to PTL 1 and the like). According to the conventional thermal flowmeter, it is possible to prevent deterioration of detection performance due to contamination of the flow path exposed portion (refer to PTL 1, paragraph 0008).

CITATION LIST

Patent Literature

PTL 1: JP 2017-150829 A

SUMMARY OF INVENTION

Technical Problem

In the conventional thermal flowmeter described in PTL 1, the flow of the measurement target gas is divided into the flow of the measurement target gas flowing through the measurement flow path surface and the flow of the gas flowing through the non-measurement surface on the opposite side at the end of the flow path exposing unit of the circuit package (refer to PTL 1, paragraph 0030, FIGS. 3A and 3B, and the like). The measurement flow path surface of the circuit package is a bottom surface of the recessed groove in which the flow rate detection unit is arranged. In this configuration, the flow of the measurement target gas flowing toward the measurement flow path surface is divided at the end of the circuit package and simultaneously flows into the recessed groove to narrow the cross-sectional area. Therefore, the flow of the measurement target gas is not stabilized in the flow path detection unit, and there is a problem in improving the noise performance of the flow rate detection unit.

The present disclosure provides a physical quantity detection device capable of improving noise performance of a flow rate detection unit as compared with the related art.

Solution to Problem

One aspect of the present disclosure is a physical quantity detection device that includes a plate-shaped chip package that is arranged to protrude from a wall surface of a flow path of a measurement target gas and has a width along a flow direction of the measurement target gas. The chip package includes a flow rate detection unit, an accelerating flow path having a cross-sectional area narrower than a cross-sectional area of the flow path and in which the flow rate detection unit is arranged, a measurement surface provided with the accelerating flow path, a non-measurement surface opposite to the measurement surface, and a separation flow portion that partitions the flow path into a measurement flow path facing the measurement surface and a non-measurement flow path facing the non-measurement surface. An end portion of the accelerating flow path and an end portion of the separation flow portion are separated from each other in a width direction of the chip package.

Advantageous Effects of Invention

According to the above aspect of the present disclosure, it is possible to provide the physical quantity detection device capable of stabilizing the flow of the measurement target gas flowing through the accelerating flow path in which the flow rate detection unit is arranged more than the related art and improving the noise performance of the flow rate detection unit.

DESCRIPTION OF EMBODIMENTS

Hereinafter, embodiments of a physical quantity detection device of the present disclosure will be described with reference to the drawings.

Figure 1:
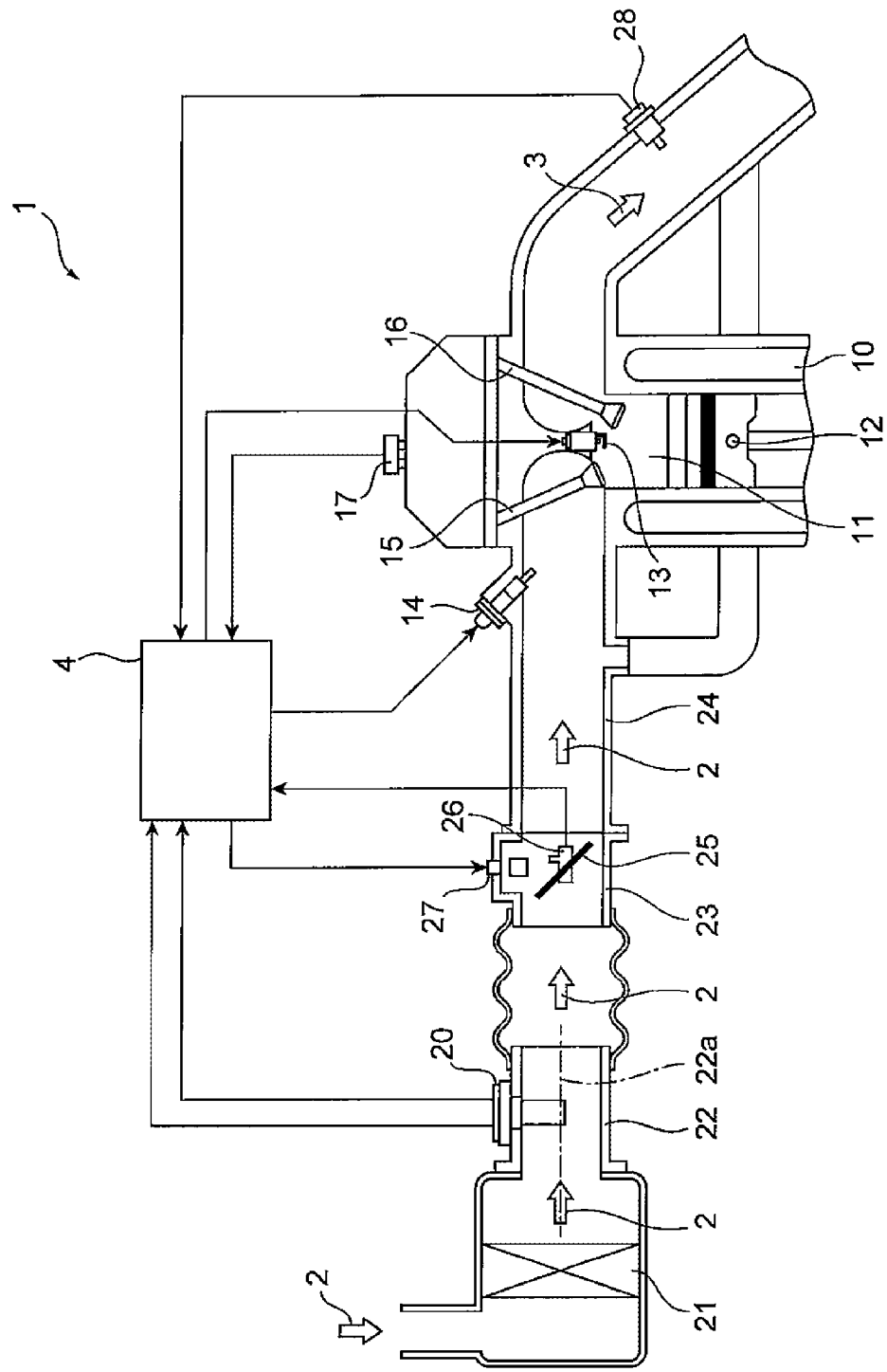
FIG. 1 is a system diagram illustrating an example of an internal combustion engine control system including a physical quantity detection device.

FIG. 1 is a system diagram illustrating an example of an electronic fuel injection type internal combustion engine control system 1 using a physical quantity detection device 20 according to an embodiment of the present disclosure. In the internal combustion engine control system 1, the intake air is taken in from an air cleaner 21 as a measurement target gas 2 based on the operation of an internal combustion engine 10 including an engine cylinder 11 and an engine piston 12. The intake air is guided to a combustion chamber of the engine cylinder 11 via an intake body which is a main passage 22, a throttle body 23, and an intake manifold 24.

The physical quantity of the measurement target gas 2 which is the intake air guided to the combustion chamber is measured by the physical quantity detection device 20. Further, fuel is supplied from a fuel injection valve 14 based on the physical quantity measured by the physical quantity detection device 20, and is guided to the combustion chamber in a state of an air-fuel mixture together with the intake air. In this embodiment, the fuel injection valve 14 is provided in the intake port of the internal combustion engine 10, the fuel injected into the intake port is mixed with the intake air, and the air-fuel mixture of the fuel and the intake air is guided to the combustion chamber via an intake valve 15. The air-fuel mixture guided to the combustion chamber is explosively burned by spark ignition of an ignition plug 13 to generate mechanical energy.

The gas after explosion is guided from an exhaust valve 16 to an exhaust pipe, and discharged as an exhaust gas 3 from the exhaust pipe to the outside of the vehicle. The flow rate of the measurement target gas 2 (intake air) guided to the combustion chamber is controlled by a throttle valve 25 of which the opening is changed on the basis of an operation of an accelerator pedal. In addition, the fuel supply amount is controlled based on the flow rate of the intake air guided to the combustion chamber. By controlling the opening degree of the throttle valve 25 to control the flow rate of the intake air guided to the combustion chamber, the mechanical energy generated by the internal combustion engine 10 can be controlled.

The physical quantity detection device 20 measures physical quantities such as a flow rate, a temperature, humidity, and a pressure of the measurement target gas 2 which is the intake air taken in through the air cleaner 21 and flowing through the main passage 22. The physical quantity detection device 20 outputs an electric signal corresponding to the physical quantity of the intake air. An output signal of the physical quantity detection device 20 is input to the control device 4.

In addition, the output of a throttle angle sensor 26 which measures the opening of the throttle valve 25 is input to the control device 4. Further, the output of a rotational angle sensor 17 is input to the control device 4 to measure the engine piston 12 of the internal combustion engine 10, positions and states of the intake valve 15 and the exhaust valve 16, and a rotation speed of the internal combustion engine 10. The output of an oxygen sensor 28 is input to the control device 4 to measure a state of a mixture ratio between the fuel amount and the air amount of the exhaust gas 3.

The control device 4 calculates the fuel injection amount and the ignition timing based on the physical quantity of the intake air which is the output of the physical quantity detection device 20 and the rotational speed of the internal combustion engine 10 measured based on the output of the rotational angle sensor 17. On the basis of these calculation results, the fuel amount supplied from the fuel injection valve 14 and the ignition timing of the ignition plug 13 are controlled. The fuel supply amount and the ignition timing are actually controlled finely on the basis of a change state of the temperature and throttle angle measured by the physical quantity detection device 20, a change state of the engine rotation speed, and a state of the air-fuel ratio measured by the oxygen sensor 28.

The control device 4 controls an air amount bypassing the throttle valve 25 using an idle air control valve 27 in an idle operation state of the internal combustion engine 10, and controls the rotation speed of the internal combustion engine 10 in the idle operation state.

The fuel supply amount and the ignition timing which are main control amounts of the internal combustion engine 10 both are calculated using the output of the physical quantity detection device 20 as a main parameter. Therefore, the improvement in measurement accuracy of the physical quantity detection device 20, the suppression from change with time, and the improvement in reliability are important to improve the control accuracy and to secure the reliability of the vehicle.

Particularly, in recent years, a desire for saving fuel of the vehicle is extremely increased, and a desire for cleaning the exhaust gas is extremely increased. In order to meet these demands, it is extremely important to improve the measurement accuracy of the physical quantity of the intake air which is the measurement target gas 2 measured by the physical quantity detection device 20. It is also important that the physical quantity detection device 20 maintains high reliability.

The vehicle on which the physical quantity detection device 20 is mounted is used in an environment where changes in temperature and humidity are relatively large. It is desirable that the physical quantity detection device 20 consider a response to a change in temperature or humidity in the use environment and a response to dust, contaminants, and the like. The physical quantity detection device 20 is mounted on an intake pipe affected by heat generated from internal combustion engine 10. Therefore, heat generated by the internal combustion engine 10 is transmitted to the physical quantity detection device 20 via the intake pipe which is the main passage 22. Since the physical quantity detection device 20 measures the flow rate of the measurement target gas by performing heat transfer with the measurement target gas, it is important to suppress the influence of heat from the outside as much as possible.

As described below, the physical quantity detection device 20 mounted on the vehicle not only solves the problem described in the section of the problem to be solved by the invention and exerts the effect described in the section of the effect of the invention. As described below, the physical quantity detection device 20 solves various problems required as a product in sufficient consideration of the various problems described above, and exhibits various effects.

Specific problems to be solved and specific effects to be obtained by the physical quantity detection device 20 will be described in the following description of the embodiment.

Figure 2:
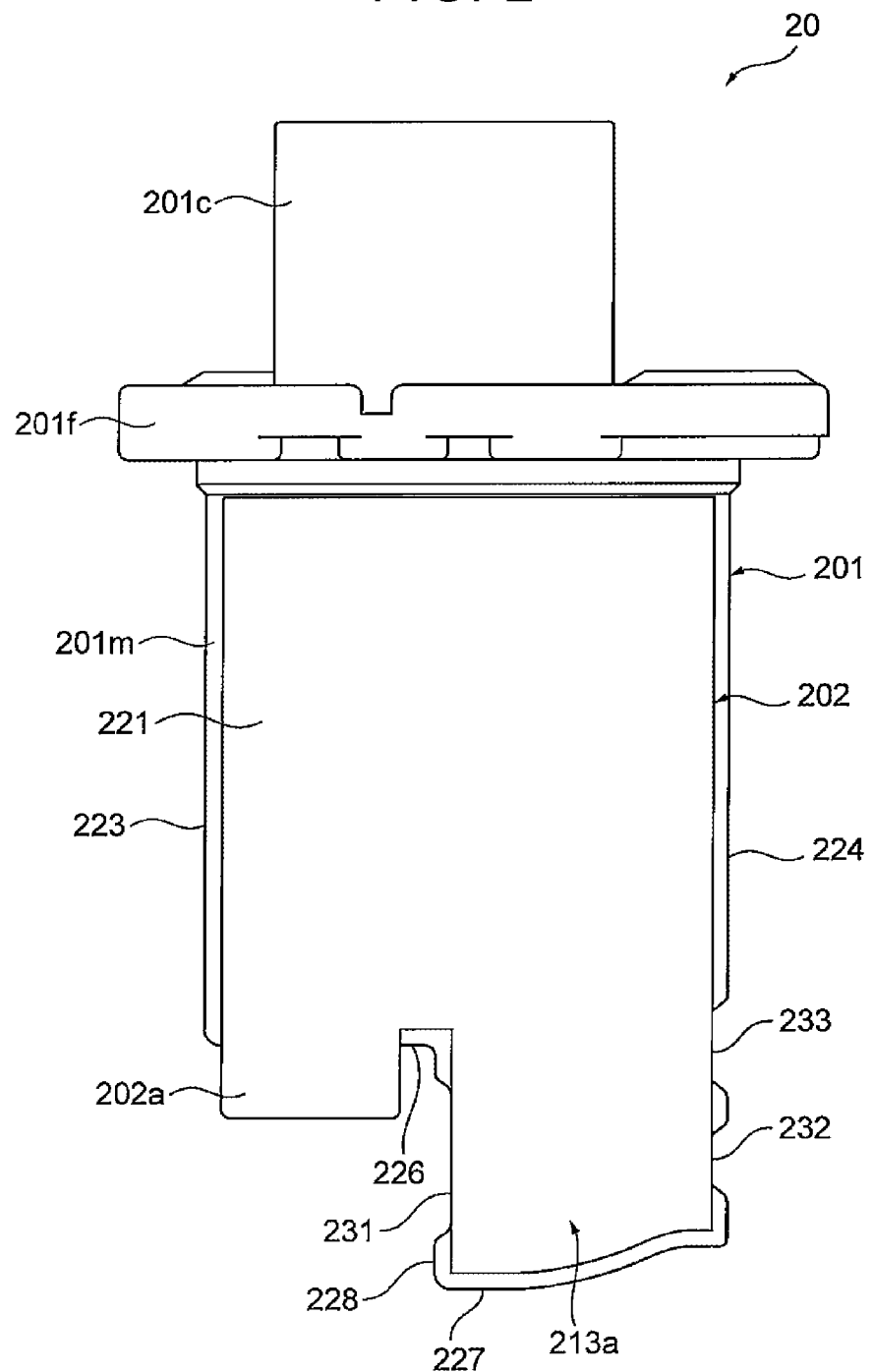
FIG. 2 is a front view of the physical quantity detection device according to a first embodiment of the present disclosure.
Figure 3:
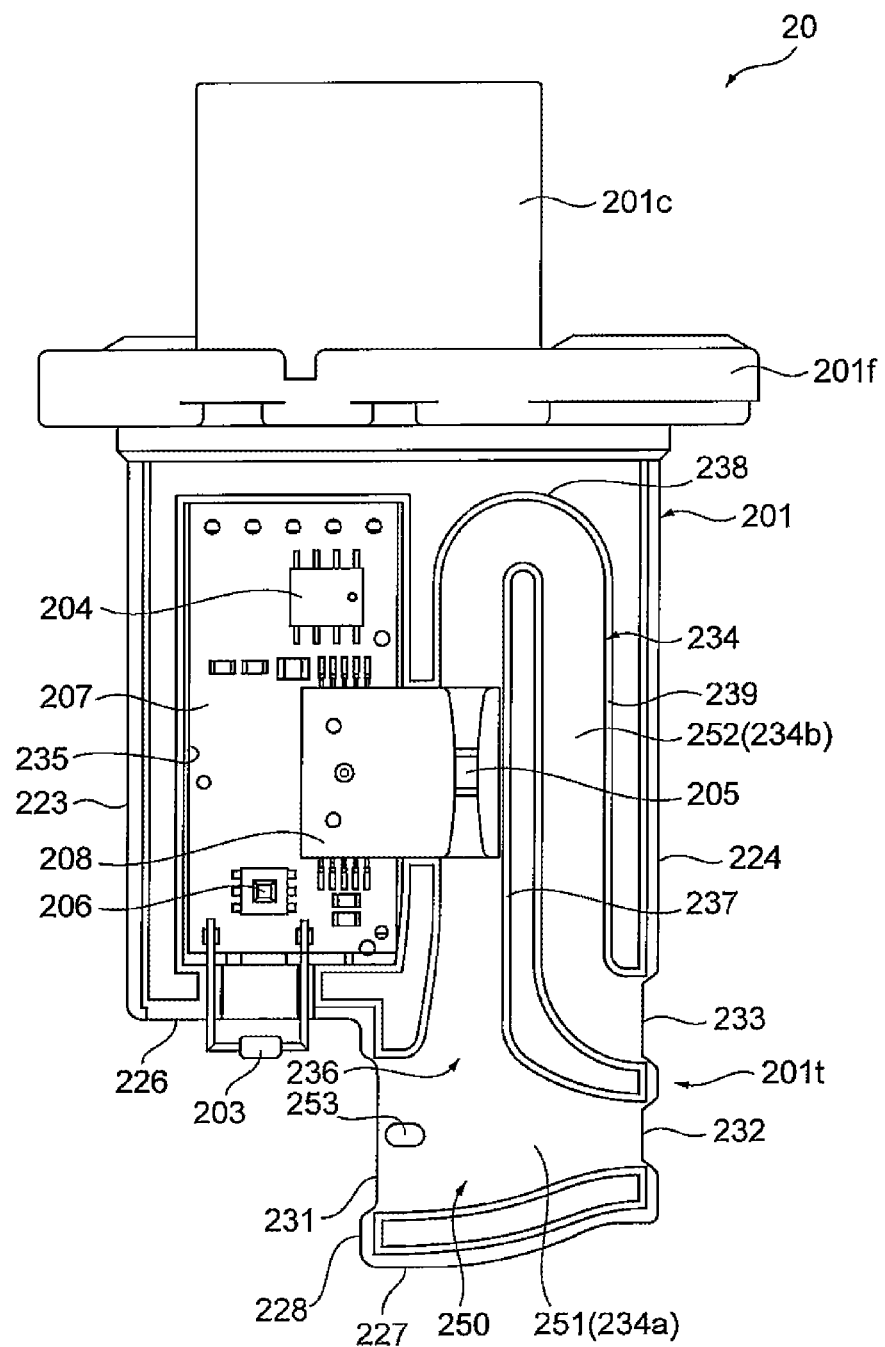
FIG. 3 is a front view of the physical quantity detection device illustrated in FIG. 2 from which a cover is removed.

FIG. 2 is a front view of physical quantity detection device 20 illustrated in FIG. 1. FIG. 3 is a front view of physical quantity detection device 20 illustrated in FIG. 2 in a state where a cover 202 is removed. In FIG. 3, illustration of a sealing material for sealing the circuit board 207 is omitted.

The physical quantity detection device 20 is used by being inserted into the main passage 22 from a mounting hole provided in a passage wall of the main passage 22. The physical quantity detection device 20 includes a housing 201 and the cover 202 attached to the housing 201. The housing 201 is formed by injection molding a synthetic resin material, and the cover 202 is formed of a plate-like member made of a conductive material such as an aluminum alloy. The cover 202 is formed in a thin plate shape and has a wide flat cooling surface.

The housing 201 includes a flange 201$f$ fixed to the intake body that is the main passage 22, a connector 201$c$ protruding from the flange 201$f$ and exposed to the outside from the intake body for electrical connection with an external device, and a measurement unit 201$m$ extending from the flange 201$f$ so as to protrude toward the center of the main passage 22.

The flange 201$f$ has, for example, a substantially rectangular shape in plan view having a predetermined plate thickness, and has a through hole at a corner. For example, the flange 201$f$ is fixed to the main passage 22 by inserting a fixing screw into a through hole at a corner portion and screwing the fixing screw into a screw hole of the main passage 22.

For example, four external terminals and a correction terminal are provided inside the connector 201$c$. The external terminal is a terminal for outputting a physical quantity such as a flow rate or a temperature which is a measurement result of the physical quantity detection device 20 and a power source terminal for supplying DC power for operating the physical quantity detection device 20. The correction terminal is used for the measurement of the manufactured physical quantity detection device 20, obtains the correction value related to each physical quantity detection device 20, and stores the correction value in the memory inside the physical quantity detection device 20.

The measurement unit 201$m$ has a thin and long shape extending from the flange 201$f$ toward the center direction of the main passage 22, and has a wide front surface 221, a back surface, and an upstream end surface 223 and a downstream end surface 224 which are a pair of narrow side surfaces. The measurement unit 201$m$ is inserted into the inside from, for example, a mounting hole provided in the main passage 22, and is fixed to the main passage 22 via the flange 201$f$ by bringing the flange 201$f$ into contact with the main passage 22 and fixing the flange 201$f$ to the main passage 22 with a screw.

The measurement unit 201$m$ protrudes from the inner wall of the main passage 22 toward a central axis 22$a$ of the main passage 22 in a state where the physical quantity detection device 20 is attached to the main passage 22. The front surface 221 and the back surface are arranged in parallel along the central axis 22$a$ of the main passage 22. Of the narrow upstream end surface 223 and the downstream end surface 224 of the measurement unit 201$m$, the upstream end surface 223 on one side in the lateral direction of the measurement unit 201$m$ is arranged to face the upstream side of the main passage 22, and the downstream end surface 224 on the other side in the lateral direction of the measurement unit 201$m$ is arranged to face the downstream side of the main passage 22.

The front surface 221 of the measurement unit 201$m$ is flat from the upstream end surface 223 to the downstream end surface 224 along the lateral direction. On the other hand, the back surface of the measurement unit 201$m$ has a chamfered corner portion on the downstream end surface 224 side, and is inclined in a direction gradually approaching the front surface as it proceeds from the intermediate position in the lateral direction to the downstream end surface 224. As a result, the cross-sectional shape of the measurement unit 201$m$ is a so-called streamlined shape. Therefore, the measurement target gas 2 flowing from the upstream side of the main passage 22 can be smoothly guided downstream along the front surface 221 and the back surface of the measurement unit 201$m$, and the fluid resistance of the measurement unit 201$m$ with respect to the measurement target gas 2 can be reduced.

The measurement unit 201$m$ has a stepped end in the protruding direction, and has a lower surface 226 on the upstream side of the main passage 22 and a lower surface 227 on the downstream side of the main passage 22 in a state where the physical quantity detection device 20 is attached to the main passage 22. In the measurement unit 201$m$, the lower surface 227 on the downstream side protrudes in the protruding direction from the lower surface 226 on the upstream side, and a step surface 228 connecting the lower surface 226 on the upstream side and the lower surface 227 on the downstream side faces the upstream side of the main passage 22.

In the measurement unit 201$m$, an inlet 231 for taking a part of the measurement target gas 2 such as the intake air into the sub-passage in the measurement unit 201$m$ is provided to be opened on the step surface 228 of a distal end portion 201$t$ protruding from the lower surface 226 on the upstream side on the opposite side of the flange 201$f$. A first outlet 232 and a second outlet 233 for returning the measurement target gas 2 taken into the sub-passage in the measurement unit 201m to the main passage 22 are provided to be opened on the downstream end surface 224 of the distal end portion 201t of the measurement unit 201m.

That is, the measurement unit 201m has the upstream end surface 223 as a first wall portion arranged toward the upstream side in the flow direction of the measurement target gas 2 in the main passage 22. In addition, the measurement unit 201m has the step surface 228 of the distal end portion 201t as a second wall portion arranged toward the upstream side in the flow direction of the measurement target gas 2 at a position on the downstream side in the flow direction of the measurement target gas 2 in the main passage 22 with respect to the upstream end surface 223 as the first wall portion. The inlet 231 of the sub-passage is opened on the step surface 228 of the distal end portion 201t.

In the physical quantity detection device 20, since the inlet 231 of the sub-passage is provided at the distal end portion 201t of the measurement unit 201m extending from the flange 201f toward the center direction of the main passage 22, it is possible to take gas in a portion close to the central portion away from the inner wall surface, not in the vicinity of the inner wall surface of the main passage 22, into the sub-passage. Therefore, the physical quantity detection device 20 can measure the flow rate of the gas in the portion away from the inner wall surface of the main passage 22, and can suppress a decrease in measurement accuracy due to the influence of heat or the like.

In the vicinity of the inner wall surface of the main passage 22, it is likely to be affected by the temperature of the main passage 22, and the temperature of the measurement target gas 2 is different from the original temperature of the gas, which is different from the average state of the main gas in the main passage 22. In particular, when the main passage 22 is an intake body of the engine, it is often maintained at a high temperature under the influence of heat from the engine. For this reason, the gas in the vicinity of the inner wall surface of the main passage 22 is often higher than the original air temperature of the main passage 22, which causes a decrease in measurement accuracy. In addition, the fluid resistance is large in the vicinity of the inner wall surface of the main passage 22, and the liquid speed becomes lowered compared to an average liquid speed of the main passage 22. Therefore, when the gas in the vicinity of the inner wall surface of the main passage 22 is taken into the sub-passage as the measurement target gas 2, a decrease in the flow velocity with respect to the average flow velocity of the main passage 22 may lead to a measurement error.

In the physical quantity detection device 20, since the inlet 231 is provided at the distal end portion 201t of the thin and long measurement unit 201m extending from the flange 201f toward the center of the main passage 22, it is possible to reduce a measurement error related to a decrease in the flow velocity in the vicinity of the inner wall surface of the main passage 22. In addition, in the physical quantity detection device 20, not only the inlet 231 is provided at the distal end portion 201t of the measurement unit 201m extending from the flange 201f toward the center of the main passage 22, but also the first outlet 232 and the second outlet 233 of the sub-passage are provided at the distal end portion 201t of the measurement unit 201m, so that the measurement error can be further reduced.

The physical quantity detection device 20 has a shape in which the measurement unit 201m extends long along the axis from the outer wall of the main passage 22 toward the center, but the width of the upstream end surface 223 and the width of the downstream end surface 224 are narrower than the width of the front surface 221, and the measurement unit 201m has a plate shape. As a result, the physical quantity detection device 20 can suppress the fluid resistance to a small value with respect to the measurement target gas 2.

The measurement unit 201m is provided with a sub-passage groove 250 for forming a sub-passage 234 and a circuit chamber 235 for accommodating the circuit board 207. The circuit chamber 235 and the sub-passage groove 250 are recessed in front of the measurement unit 201m, and are arranged separately on one side and the other side in the lateral direction of the measurement unit 201m. The circuit chamber 235 is arranged at a position on the upstream side in the flow direction of the measurement target gas 2 in the main passage 22, and the sub-passage 234 is arranged at a position on the downstream side in the flow direction of the measurement target gas 2 in the main passage with respect to the circuit chamber 235. In the flow direction of the measurement target gas 2 in the main passage 22, the upstream surface of the upstream wall of the circuit chamber 235 is set as the upstream end surface 223 of the measurement unit 201m, so that space saving can be achieved.

The sub-passage groove 250 forms the sub-passage 234 in cooperation with the cover 202. The sub-passage 234 is provided to extend along the longitudinal direction of the measurement unit 201m which is the protruding direction of the measurement unit 201m. The sub-passage groove 250 forming the sub-passage 234 includes a first sub-passage groove 251 and a second sub-passage groove 252 branching in the middle of the first sub-passage groove 251.

The first sub-passage groove 251 is formed to extend along the lateral direction of the measurement unit 201m between the inlet 231 opened to the step surface 228 of the distal end portion 201t of the measurement unit 201m and the first outlet 232 opened to the downstream end surface 224 of the distal end portion 201t of the measurement unit 201m.

The inlet 231 is opened so as to face the upstream side in the flow direction of the measurement target gas 2 in the main passage 22. The first sub-passage groove 251 forms a first sub-passage 234a extending from the inlet 231 along the central axis 22a of the main passage 22 to the first outlet 232 with respect to the cover 202.

The first sub-passage 234a takes in the measurement target gas 2 flowing in the main passage 22 from the inlet 231, and returns the taken measurement target gas 2 from the first outlet 232 to the main passage 22. The first sub-passage 234a extends from the inlet 231 along the flow direction of the measurement target gas 2 in the main passage 22 and is connected to the first outlet 232. The first sub-passage 234a has a branch portion 236 between the inlet 231 and the first outlet 232.

The branch portion 236 is provided near the inlet 231 on the upstream side of the measurement target gas 2 during the forward flow in the 'first sub-passage 234a extending along the central axis 22a of the main passage 22. Here, as illustrated in FIG. 1, the measurement target gas 2 flows along the central axis 22a of the main passage 22 from the air cleaner 21 toward the internal combustion engine 10 during forward flow. The measurement target gas 2 flowing through the main passage 22 is taken into the first sub-passage 234a from the inlet 231, flows through the first sub-passage 234a toward the first outlet 232, and flows into a second sub-passage 234b from the branch portion 236 during forward flow.

The second sub-passage groove 252 branches toward the proximal end portion of the measurement unit 201m, that is, the flange 201*f* at an intermediate position of the first sub-passage groove 251, and extends in the longitudinal direction of the measurement unit 201*m*, that is, in a direction intersecting the central axis 22*a* of the main passage 22, for example, in a direction substantially orthogonal to the central axis 22*a*. Further, the second sub-passage groove 252 is curved and folded in, for example, a U shape or an arc shape toward the distal end portion 201*t* in the vicinity of the flange 201*f* of the measurement unit 201*m*, and extends in the longitudinal direction of the measurement unit 201*m*, that is, in a direction intersecting the central axis 22*a* of the main passage 22, for example, in a direction substantially orthogonal to the central axis 22*a*.

The second sub-passage groove 252 finally bends toward the downstream end surface 224 of the measurement unit 201*m* so as to curve in, for example, an arc shape, and is connected to the second outlet 233. The second outlet 233 is opened to face the downstream side in the flow direction of the measurement target gas 2 in the main passage 22. The second outlet 233 has an opening area substantially equal to or slightly larger than that of the first outlet 232, and is formed at a position adjacent to the first outlet 232 on the proximal end side in the longitudinal direction of the measurement unit 201*m*. The second sub-passage groove 252 forms the second sub-passage 234*b* branching from the first sub-passage 234*a* toward the flange 201*f* and reaching the second outlet 233 with respect to the cover 202.

The second sub-passage 234*b* allows the measurement target gas 2 branched from and flowing into the first sub-passage 234*a* to pass therethrough and returns the measurement target gas 2 from the second outlet 233 to the main passage 22. The second sub-passage 234*b* has a path that reciprocates along the longitudinal direction of the measurement unit 201*m*. More specifically, the second sub-passage 234*b* includes, for example, a linear upstream portion 237, an arc-shaped or U-shaped curved portion 238, and a linear downstream portion 239.

The upstream portion 237 is branched from the branch portion 236 of the first sub-passage 234*a*, for example, and extends straight in a substantially straight line in a direction intersecting the central axis 22*a* of the main passage 22. The upstream portion 237 extends, for example, in a direction substantially orthogonal to the central axis 22*a* of the main passage 22, that is, in a direction from the branch portion 236 of the first sub-passage 234*a* toward the flange 201*f*.

The curved portion 238 is connected to, for example, a downstream end portion of the upstream portion 237 in the vicinity of the flange 201*f*, and is curved so as to turn back toward the central axis 22*a* of the main passage 22. The curved portion 238 has, for example, an arc shape or a U shape, and is curved so as to fold the second sub-passage 234*b* by 180 degrees in the opposite direction.

The downstream portion 239 is connected to, for example, a downstream end portion of the curved portion 238 in the vicinity of the flange 201*f*, and extends straight in a substantially straight line shape toward the central axis 22*a* of the main passage 22.

The downstream portion 239 extends, for example, substantially parallel to the upstream portion 237 toward the distal end portion 201*t* of the measurement unit 201*m*, and extends on the downstream side of the branch portion 236 in the first sub-passage 234*a*. The downstream portion 239 is curved in the direction along the central axis 22*a* of the main passage 22 in the vicinity of the second outlet 233 of the distal end portion 201*t* and is connected to the second outlet 233.

The second sub-passage 234*b* has a curved shape. More specifically, the upstream portion 237 of the second sub-passage 234*b* is branched from the branch portion 236 of the first sub-passage 234*a* and extends in a direction intersecting the central axis 22*a* of the main passage 22. The curved portion 238 of the second sub-passage 234*b* is curved so as to be folded back from the upstream portion 237 toward the central axis 22*a* of the main passage 22. The downstream portion 239 of the second sub-passage 234*b* extends from the curved portion 238 toward the central axis 22*a* of the main passage 22. The upstream portion 237, the curved portion 238, and the downstream portion 239 form a curved shape of the second sub-passage 234*b*.

Although not illustrated, for example, the second outlet 233 may be omitted, the downstream portion 239 of the second sub-passage 234*b* may be connected to the downstream side of the branch portion 236 of the first sub-passage 234*a*, and the second sub-passage 234*b* may join the first sub-passage 234*a*.

In the second sub-passage 234*b*, for example, a flow rate detection unit 205 is arranged in the upstream portion 237.

More specifically, in the upstream portion 237 of the second sub-passage 234*b*, the flow rate detection unit 205 is arranged in an intermediate portion between the first sub-passage 234*a* and the curved portion 238. Since the second sub-passage 234*b* has the curved shape as described above, the passage length can be secured longer, and when pulsation occurs in the measurement target gas 2 in the main passage 22, the influence on the flow rate detection unit 205 can be reduced.

According to the above configuration, the sub-passage 234 can be formed along the longitudinal direction which is the protruding direction of the measurement unit 201*m*, and the length of the sub-passage 234 can be ensured to be sufficiently long. As a result, the physical quantity detection device 20 can include the sub-passage 234 having a sufficient length. Therefore, the physical quantity detection device 20 can suppress the fluid resistance to a small value and can measure the physical quantity of the measurement target gas 2 with high accuracy.

Since the first sub-passage 234*a* extends from the inlet 231 in the lateral direction of the measurement unit 201*m*, that is, along the central axis 22*a* of the main passage 22 and reaches the first outlet 232, foreign matter such as dust that has entered the first sub-passage 234*a* from the inlet 231 can be discharged as it is from the first outlet 232. As a result, it is possible to suppress the foreign matter from entering the second sub-passage 234*b* and to suppress the influence on the flow rate detection unit 205 arranged in the second sub-passage 234*b*.

The inlet 231 and the first outlet 232 of the first sub-passage 234*a* have a larger opening area in the inlet 231 than in the first outlet 232. By making the opening area of the inlet 231 larger than that of the first outlet 232, the measurement target gas 2 flowing into the first sub-passage 234*a* can be reliably guided also to the second sub-passage 234*b* branching in the middle of the first sub-passage 234*a*.

In the vicinity of the inlet 231 of the first sub-passage groove 251, a protrusion 253 is provided at a central position of the inlet 231 in the longitudinal direction of the measurement unit 201*m*. In the protrusion 253, the size of the inlet 231 is divided into two equal parts in the longitudinal direction of the measurement unit 201*m*, and each opening area of the divided inlet 231 is smaller than each opening area of the first outlet 232 and the second outlet 233. The protrusion 253 restricts the size of the foreign matter that can enter the first sub-passage 234*a* from the inlet 231 to a size smaller than those of the first outlet 232 and the second outlet 233, and can prevent the first outlet 232 and the second outlet 233 from being blocked by the foreign matter.

The circuit board 207 is accommodated in the circuit chamber 235 provided on one side in the lateral direction of the measurement unit 201*m*. The circuit board 207 has a rectangular shape extending along the longitudinal direction of the measurement unit 201*m*, and a chip package 208 having the flow rate detection unit 205, a pressure sensor 204, a temperature and humidity sensor 206, and an intake air temperature sensor 203 are mounted on the surface thereof.

The circuit board 207 has a mounting portion common to all the sensors, and can be commonly used for mounting patterns of various sensors. The surface of the circuit board 207 is arranged, for example, substantially parallel to the measurement target gas 2 flowing through the main passage 22. As a result, the thickness of the measurement unit 201*m* can be reduced, and the pressure loss of the measurement target gas 2 flowing through the main passage 22 can be reduced.

The chip package 208 is mounted on the circuit board 207, and the flow rate detection unit 205 is provided at the distal end portion. The distal end portion of the chip package 208 is mounted in a state of protruding from the circuit board 207 into the second sub-passage 234*b* at the center position in the longitudinal direction of the circuit board 207. As a result, the flow rate detection unit 205 provided at the distal end portion of the chip package 208 is arranged in the second sub-passage 234*b*. The chip package 208 is arranged between the sub-passage 234 and the circuit chamber 235. Note that a more detailed configuration of the chip package 208 which is a characteristic part of the physical quantity detection device 20 of this embodiment will be described later.

Since the chip package 208 is arranged between the sub-passage 234 and the circuit chamber 235, the circuit chamber 235 and the sub-passage 234 are separated from each other, and the flow to the flow rate detection unit 205 arranged in the chip package 208 is rate-limited by the shape of the sub-passage 234. Therefore, there is no barrier object that hinders the flow of the measurement target gas 2 in the sub-passage 234, and a stable flow of the measurement target gas 2 can be supplied to the flow rate detection unit 205. Therefore, it is possible to downsize the measurement unit 201*m* while maintaining the flow rate sensitivity, noise performance, and pulsation characteristics of the flow rate detection unit.

The pressure sensor 204 is mounted on the proximal end side in the longitudinal direction of the circuit board 207 with respect to the chip package 208, and the temperature and humidity sensor 206 is mounted on the distal end side in the longitudinal direction of the circuit board 207 with respect to the chip package 208. A lead of the intake air temperature sensor 203 is connected to the surface of the circuit board 207. The intake air temperature sensor 203 is mounted such that the lead is connected to a position on the distal end side in the longitudinal direction of the circuit board 207 with respect to the temperature and humidity sensor 206, and the sensor body is arranged at a position protruding from the circuit board 207 in the longitudinal direction and exposed to the outside of the measurement unit 201*m*.

The intake air temperature sensor 203 is arranged between the upstream end surface 223 of the measurement unit 201*m* on the flange 201*f* side and the step surface 228 of the distal end portion 201*t*. The intake air temperature sensor 203 is mounted on the circuit board 207 and exposed to the outside of the measurement unit 201*m*. The intake air temperature sensor 203 includes an axial lead component having a cylindrical sensor body and a pair of leads protruding in a direction away from each other from both axial end portions of the sensor body. The measurement unit 201*m* is provided with a protector 202*a* for protecting the intake air temperature sensor 203.

In the measurement unit 201*m*, the pressure sensor 204, the flow rate detection unit 205, the temperature and humidity sensor 206, and the intake air temperature sensor 203 are arranged in this order from the proximal end side toward the distal end side along the longitudinal direction, that is, toward the protruding direction of the measurement unit 201*m*. The pressure sensor 204 measures the pressure of the measurement target gas 2, and the flow rate detection unit 205 measures the flow rate of the measurement target gas 2. The temperature and humidity sensor 206 measures the humidity of the measurement target gas 2, and the intake air temperature sensor measures the temperature of the measurement target gas 2.

Figure 4A:
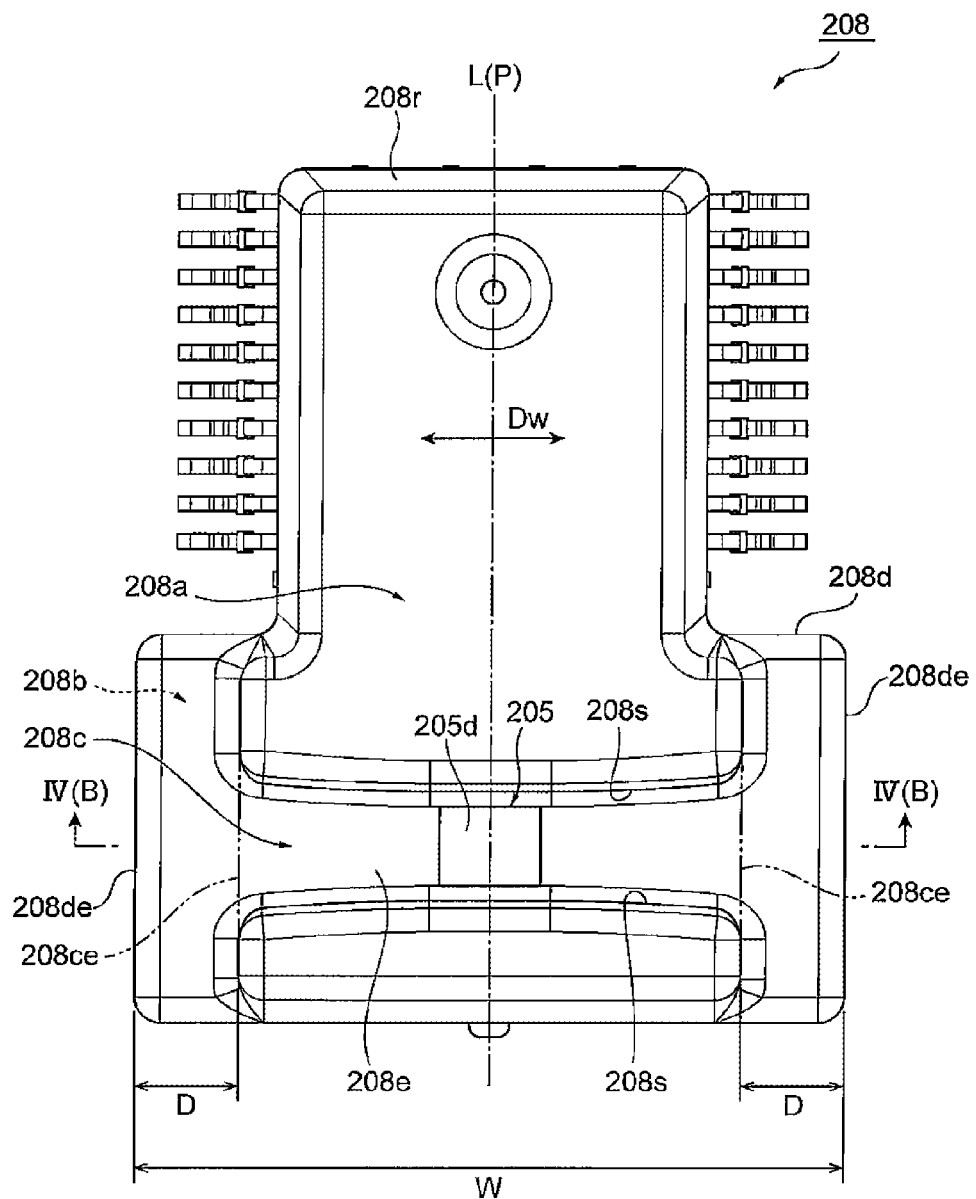
FIG. 4A is a front view of a chip package of the physical quantity detection device illustrated in FIG. 3.
Figure 4B:
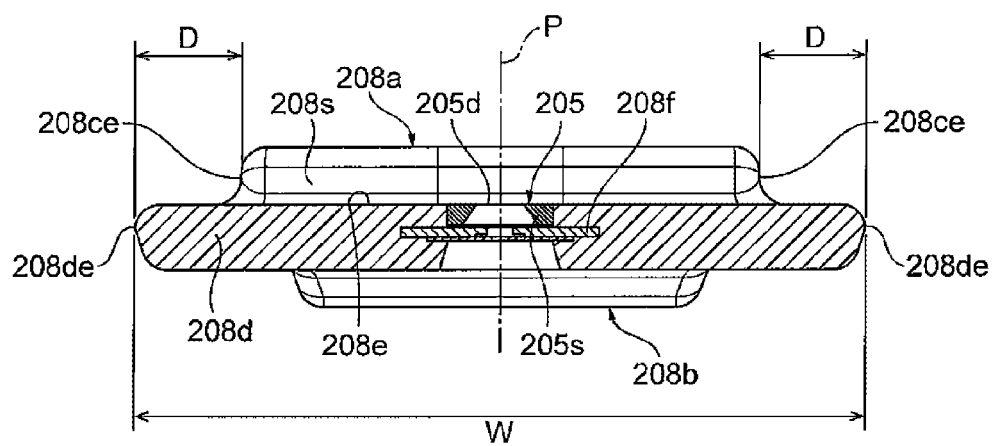
FIG. 4B is a cross-sectional view of the chip package taken along line IV(B)-IV(B) of FIG. 4A.

Hereinafter, some configuration examples of the chip package 208 which is a characteristic part of the physical quantity detection device 20 of this embodiment will be described in detail with reference to FIGS. 4A to 18C. FIG. 4A is a front view illustrating an example of a configuration of the chip package 208 included in the physical quantity detection device 20 illustrated in FIG. 3. FIG. 4B is a cross-sectional view of the chip package 208 taken along line IV(B)-IV(B) in FIG. 4A.

As described above, the chip package 208 is arranged so as to protrude from the wall surface of the sub-passage 234 (see FIG. 3) which is the flow path of the measurement target gas 2 provided in the measurement unit 201*m* of the housing 201 of the physical quantity detection device 20, and is provided in a plate shape having the width W along the flow direction of the measurement target gas 2. For example, in the example illustrated in FIG. 4A, the chip package 208 has a configuration that is substantially plane-symmetric with respect to a plane P including a center line L orthogonal to the width direction Dw of the chip package 208 and parallel to the protruding direction.

The chip package 208 includes, for example, a flow rate detection unit 205, a measurement surface 208*a*, a non-measurement surface 208*b*, an accelerating flow path 208*c*, and a separation flow portion 208*d*. The chip package 208 includes, for example, a lead frame 208*f* and a sealing portion 208*r*.

The flow rate detection unit 205 is a flow rate sensor mounted on the lead frame 208*f*. The flow rate detection unit 205 is driven by, for example, a semiconductor chip such as an LSI. In this configuration, the flow rate detection unit 205 and the driving semiconductor chip are separately arranged, but a one-chip configuration in which functions are integrated may be adopted in order to reduce the size. The flow rate detection unit 205 is arranged, for example, on a bottom wall portion 208*e* of the accelerating flow path 208*c* of the groove shape formed by the sealing portion 208*r*. As described above, a part of the chip package 208 protrudes into the second sub-passage 234*b* provided in the measurement unit 201*m* of the housing 201, so that the flow rate detection unit 205 is arranged in the upstream portion 237 of the second sub-passage 234*b* and detects the flow rate of the gas flowing through the upstream portion 237.

The flow rate detection unit 205 includes, for example, a semiconductor substrate 205*s* made of a semiconductor such as silicon (Si), and a diaphragm 205*d* and a cavity provided in the semiconductor substrate 205s. The diaphragm 205d is a thin-film portion provided on the semiconductor substrate 205s. The diaphragm 205d is provided, for example, by forming a recessed cavity in the semiconductor substrate 205s.

The flow rate detection unit 205 includes a heat generating resistor (not illustrated), a temperature sensitive resistor, a fixing resistor, a plurality of electrode pads, and the like on the surface of the diaphragm 205d facing the accelerating flow path 208c. More specifically, the flow rate detection unit 205 is, for example, a thermal air flowmeter that includes a pair of temperature sensitive resistors on both sides of the heat generating resistor in the flow direction of the measurement target gas 2 and measures the flow rate of the air based on the temperature difference between the pair of temperature sensitive resistors.

The measurement surface 208a and the non-measurement surface 208b are one surface and the other surface of the chip package 208 provided in a generally flat plate shape. More specifically, the measurement surface 208a and the non-measurement surface 208b are front and back surfaces of the sealing portion 208r formed in a flat plate shape. The measurement surface 208a is provided with the flow rate detection unit 205 and the accelerating flow path 208c. The non-measurement surface 208b is a surface opposite to the measurement surface 208a, and is a relatively flat surface without the flow rate detection unit 205 and the accelerating flow path 208c. The non-measurement surface 208b has a step in the thickness direction of the chip package 208 between the distal end portion in the protruding direction of the chip package 208 and a portion on the proximal end portion in the protruding direction of the chip package 208.

The accelerating flow path 208c is a flow path having a cross-sectional area narrower than that of the second sub-passage 234b which is a flow path of the measurement target gas 2 in the physical quantity detection device 20, and the flow rate detection unit 205 is arranged in the central portion. The accelerating flow path 208c includes a pair of side wall portions 208s facing the protruding direction of the chip package 208 in the second sub-passage 234b and extending in the width direction Dw of the chip package 208. The accelerating flow path 208c has the bottom wall portion 208e between the pair of side wall portions 208s.

That is, for example, the accelerating flow path 208c is provided in a recessed groove shape extending in the width direction Dw of the chip package 208 on the measurement surface 208a of the chip package 208, and the flow rate detection unit 205 is arranged at the center of the bottom wall portion 208e in the width direction Dw of the chip package 208. The accelerating flow path 208c has, for example, a throttle shape in which the width gradually narrows from both end portions in the width direction Dw of the chip package 208 toward the central portion. With this throttle shape, the measurement target gas 2 flowing through the accelerating flow path 208c is rectified, and the influence of noise on the flow rate detection unit 205 can be reduced.

The positions of both the end portions 208ce and 208ce of the accelerating flow path 208c in the width direction Dw of the chip package 208 are not limited to the positions illustrated in FIG. 4A. The positions of both the end portions 208ce and 208ce of the accelerating flow path 208c may be, for example, between both end edges of the flow rate detection unit 205 in the width direction Dw of the chip package 208 and both end portions 208de and 208de of the separation flow portion 208d in the width direction Dw of the chip package 208, and may be adjacent to both end edges of the flow rate detection unit 205.

For example, the separation flow portion 208d is a portion that partitions the second sub-passage 234b of the physical quantity detection device 20, which is a flow path of the measurement target gas 2, into a measurement flow path facing the measurement surface 208a of the chip package 208 and a non-measurement flow path facing the non-measurement surface 208b of the chip package 208. The separation flow portion 208d is, for example, a flat plate-like portion arranged along the flow direction of the measurement target gas 2 flowing through the upstream portion 237 of the second sub-passage 234b in which the chip package 208 is arranged.

The separation flow portion 208d extends along the radial direction of the second sub-passage 234b orthogonal to the center line of the second sub-passage 234b. More specifically, the separation flow portion 208d extends from one side wall facing the second sub-passage 234b in the radial direction toward the other side wall. The end portion 208de of the separation flow portion 208d in the width direction Dw of the chip package 208 has an interval D with the end portion 208ce of the accelerating flow path 208c in the width direction Dw of the chip package 208. That is, in the width direction Dw of the chip package 208, the end portion 208ce of the accelerating flow path 208c and the end portion of the separation flow portion 208d are separated from each other.

In the example illustrated in FIG. 4A, in the width direction Dw of the chip package 208, both end portions 208ce and 208ce of the accelerating flow path 208c and both end portions 208de and 208de of the separation flow portion 208d are separated from each other. That is, in the width direction Dw of the chip package 208, not only the positions of the one end portion 208de of the separation flow portion 208d and the one end portion 208ce of the accelerating flow path 208c are different, but also the positions of the other end portion 208de of the separation flow portion 208d and the other end portion 208ce of the accelerating flow path 208c are different.

More specifically, for example, both the end portions 208ce and 208ce of the accelerating flow path 208c are located inside both the end portions 208de and 208de of the separation flow portion 208d in the width direction Dw of the chip package 208. That is, both the end portions 208de and 208de of the separation flow portion 208d protrude in the width direction Dw of the chip package 208 more than both the end portions 208ce and 208ce of the accelerating flow path 208c.

In the example illustrated in FIGS. 4A and 4B, the separation flow portion 208d is provided in a flat plate shape having a thickness smaller than a thickness of the convex portion of the sealing portion 208r defining the accelerating flow path 208c. Thus, the separation flow portion 208d is provided on the side of the measurement surface 208a of the chip package 208 so as to protrude outward in the width direction Dw of the chip package 208 from both end portions of the convex portion of the sealing portion 208r in the width direction Dw of the chip package 208.

In addition, the separation flow portion 208d has a flat surface having no step in the thickness direction of the chip package 208 from one end to the other end in the width direction Dw of the chip package 208 on the non-measurement surface 208b side of the chip package 208. The separation flow portion 208d has, for example, a recess that exposes a part of the lead frame 208f covered with a sealing material such as a polyimide tape at a position corresponding to the flow rate detection unit 205 on the non-measurement surface 208b side of the chip package 208.

The lead frame 208f is a plate-like member made of a conductive metal such as copper, and has a pattern shape including a portion that protrudes from the sealing portion 208r and becomes a terminal portion of the chip package 208. On one surface of the lead frame 208f, for example, electronic components such as the flow rate detection unit 205 and LSI for driving the flow rate detection unit 205 are mounted. The lead frame 208f defines, for example, a ventilation passage that communicates a cavity facing the diaphragm 205d of the flow rate detection unit 205 with the outside of the chip package 208 to prevent sealing of the cavity.

The sealing portion 208r is a resin portion that seals a portion excluding a part of the lead frame 208f constituting the terminal portion of the chip package 208 in a state where the diaphragm 205d provided in the flow rate detection unit 205 which is a sensor element is exposed. The sealing portion 208r is formed by, for example, transfer molding. As described above, the sealing portion 208r forms the accelerating flow path 208c in which the flow rate detection unit 205 is arranged. In addition, in the sealing portion 208r, the thickness of the distal end portion in the protruding direction of the chip package 208 provided with the accelerating flow path 208c and the separation flow portion 208d is smaller than the thickness of the proximal end portion of the chip package 208 where the terminal portion of the lead frame 208f is exposed. As a result, the sealing portion 208r has a step between the distal end portion and the proximal end portion of the non-measurement surface 208b.

In the example illustrated in FIGS. 4A and 4B, the sealing portion 208r has convex portions provided on both sides of the accelerating flow path 208c in the protruding direction of the chip package 208. The convex portion of the sealing portion 208r protrudes in the thickness direction of the sealing portion 208r with respect to the bottom wall portion 208e and the separation flow portion 208d of the accelerating flow path 208c to define the accelerating flow path 208c. The protruding portion of the sealing portion 208r has a step in the thickness direction of the sealing portion 208r at both ends in the width direction Dw of the chip package 208, and has a curved surface portion between the protruding portion and the separation flow portion 208d. As illustrated in FIG. 4B, the curved surface portion of the sealing portion 208r has an arc-shaped concave curved surface shape when viewed from the protruding direction of the chip package 208.

Hereinafter, the action of the physical quantity detection device 20 of this embodiment will be described.

In the physical quantity detection device 20, for example, as described above, the flange 201f is fixed to the main passage 22 in a state where the measurement unit 201m illustrated in FIG. 2 is inserted into the mounting hole provided in the intake body which is the main passage 22 illustrated in FIG. 1. As a result, in the physical quantity detection device 20, the measurement unit 201m is arranged so as to protrude toward the center of the main passage 22, and the inlet 231 is arranged so as to face the upstream side during the forward flow of the measurement target gas 2 in the main passage 22.

For example, pulsation of the intake air accompanying rotation of the internal combustion engine 10 may cause not only a forward flow in which the measurement target gas 2 flows from the air cleaner 21 toward the internal combustion engine 10, but also a reverse flow in which the measurement target gas 2 flows from the internal combustion engine 10 toward the air cleaner 21. During the forward flow, the measurement target gas 2 is taken into the sub-passage 234 illustrated in FIG. 3 from the inlet 231 of the physical quantity detection device 20, a part of the measurement target gas 2 passes through the first sub-passage 234a and is discharged from the first outlet 232 to the main passage 22, and the other part of the measurement target gas 2 flows into the second sub-passage 234b at the branch portion 236.

Here, as described above, the physical quantity detection device 20 of this embodiment includes the plate-like chip package 208 which is arranged to protrude from the wall surface of the second sub-passage 234b which is the flow path of the measurement target gas 2 and has the width W along the flow direction of the measurement target gas 2. As described above, the chip package 208 includes the flow rate detection unit 205, the accelerating flow path 208c, the measurement surface 208a provided with the accelerating flow path 208c, the non-measurement surface 208b on the opposite side of the measurement surface 208a, and the separation flow portion 208d. The accelerating flow path 208c has a smaller cross-sectional area than the second sub-passage 234b that is a flow path of the measurement target gas 2, and the flow rate detection unit 205 is arranged. The separation flow portion 208d partitions the second sub-passage 234b into a measurement flow path facing the measurement surface 208a and a non-measurement flow path facing the non-measurement surface 208b. In the width direction Dw of the chip package 208, the end portion 208ce of the accelerating flow path 208c and the end portion 208de of the separation flow portion 208d are separated from each other.

With this configuration, the measurement target gas 2 flowing into the first sub-passage 234a from the inlet 231 of the physical quantity detection device 20 and further flowing into the second sub-passage 234b is diverted to the measurement flow path facing the measurement surface 208a and the non-measurement flow path facing the non-measurement surface 208b by the separation flow portion 208d. The measurement target gas diverted to the non-measurement flow path facing the non-measurement surface 208b passes through the non-measurement flow path, further passes through the curved portion 238 and the downstream portion 239 of the second sub-passage 234b, and is discharged from the second outlet 233 to the main passage 22.

On the other hand, the measurement target gas 2 divided by the separation flow portion 208d into the measurement flow path facing the measurement surface 208a flows in the width direction Dw of the chip package 208 along the separation flow portion 208d from the end portion 208de of the separation flow portion 208d to the end portion 208ce of the accelerating flow path 208c. In this process, the flow of the measurement target gas 2 disturbed by the branch at the end portion 208de of the separation flow portion 208d is rectified and stabilized. Then, a part of the rectified measurement target gas 2 flows into the accelerating flow path 208c, the flow velocity increases, and the flow rate is detected by the flow rate detection unit 205.

As described above, in the physical quantity detection device 20 of this embodiment, the end portion 208de of the separation flow portion 208d for separating the measurement target gas 2 and the end portion 208ce of the accelerating flow path 208c for increasing the flow velocity of the measurement target gas 2 are arranged at different positions in the width direction Dw of the chip package 208. As a result, the flow of the measurement target gas 2 in the flow rate detection unit 205 can be stabilized as compared with the case where the end portion 208de of the separation flow portion 208d and the end portion 208ce of the accelerating flow path 208c are at the same position in the width direction Dw of the chip package 208. Therefore, according to the physical quantity detection device 20 of this embodiment, the noise performance of the flow rate detection unit 205 can be improved as compared with the related art.

In addition, in the physical quantity detection device 20 of this embodiment, both end portions 208ce and 208ce of the accelerating flow path 208c and both end portions 208de and 208de of the separation flow portion 208d are separated from each other in the width direction Dw of the chip package 208. With this configuration, the physical quantity detection device 20 according to this embodiment can obtain the same effect as that obtained when the measurement target gas 2 flows forward even when the measurement target gas 2 flows backward.

More specifically, as described above, the pulsation of the intake air accompanying the rotation of the internal combustion engine 10 may cause a reverse flow in which the measurement target gas 2 flows from the internal combustion engine 10 toward the air cleaner 21. In this case, in the second sub-passage 234b of the physical quantity detection device 20, the measurement target gas 2 may flow backward from the second outlet 233 toward the first sub-passage 234a. However, in the physical quantity detection device 20 of this embodiment, the end portion 208ce of the accelerating flow path 208c and the end portion 208de of the separation flow portion 208d located on the upstream side at the time of the reverse flow of the measurement target gas 2 are separated in the width direction Dw of the chip package 208 by the above-described configuration.

As a result, even when the measurement target gas 2 flows backward, the measurement target gas 2 diverted to the measurement flow path facing the measurement surface 208a flows in the width direction Dw of the chip package 208 along the separation flow portion 208d from the end portion 208de of the separation flow portion 208d to the end portion 208ce of the accelerating flow path 208c.

In this process, the flow of the measurement target gas 2 disturbed by the branch at the end portion 208de of the separation flow portion 208d is rectified and stabilized. Then, a part of the rectified measurement target gas 2 flows into the accelerating flow path 208c, the flow velocity increases, and the flow rate is detected by the flow rate detection unit 205. Therefore, according to the physical quantity detection device 20 of this embodiment, the noise performance of the flow rate detection unit 205 can be improved even when the measurement target gas 2 flows backward.

In addition, in the physical quantity detection device 20 of this embodiment, both the end portions 208ce and 208ce of the accelerating flow path 208c are located inside both the end portions 208de and 208de of the separation flow portion 208d in the width direction Dw of the chip package 208.

With this configuration, during the forward flow of the measurement target gas 2, the measurement target gas 2 is first divided into the measurement flow path on the measurement surface 208a side and the measurement flow path on the non-measurement surface 208b side by the end portion 208de of the separation flow portion 208d located on the upstream side of the measurement target gas 2. Then, after the measurement target gas 2 diverted to the measurement surface 208a side is rectified by the separation flow portion 208d, the flow velocity can be increased by the accelerating flow path 208c. Further, the measurement target gas 2 having passed through the accelerating flow path 208c flows along the separation flow portion 208d on the downstream side of the accelerating flow path 208c and is rectified, and then joins the measurement target gas 2 flowing through the measurement target flow path facing the non-measurement surface 208b. As a result, the flow of the measurement target gas 2 in the flow rate detection unit 205 can be further stabilized, and the noise performance of the flow rate detection unit 205 can be further improved. For example, in the conventional configuration, an accelerating flow path extending from a surface facing the flow rate detection unit 205 to the flow rate detection unit 205 is installed. In this configuration, the noise performance can be improved by stabilizing the flow, but for example, in a case where contaminants are mixed in the measurement target gas 2, the contaminants are blown to the flow rate detection unit 205, and there is a concern that the anti-contamination performance is deteriorated. Therefore, in the physical quantity detection device 20 of this embodiment, it is possible to achieve both improvement in anti-fouling performance and improvement in noise performance.

Similarly, during the reverse flow of the measurement target gas 2, the measurement target gas 2 is first divided into the measurement flow path on the measurement surface 208a side and the measurement flow path on the non-measurement surface 208b side by the end portion 208de of the separation flow portion 208d located on the upstream side at the time of the reverse flow of the measurement target gas 2. Then, after the measurement target gas 2 diverted to the measurement surface 208a side is rectified by the separation flow portion 208d, the flow velocity can be increased by the accelerating flow path 208c. Further, the measurement target gas 2 having passed through the accelerating flow path 208c flows along the downstream separation flow portion 208d at the time of the reverse flow of the accelerating flow path 208c and is rectified, and then joins the measurement target gas 2 flowing through the measurement target flow path facing the non-measurement surface 208b. As a result, the flow of the measurement target gas 2 in the flow rate detection unit 205 can be further stabilized, and the noise performance of the flow rate detection unit 205 can be further improved.

As described above, according to this embodiment, it is possible to provide the physical quantity detection device 20 capable of stabilizing the flow of the measurement target gas 2 flowing through the accelerating flow path 208c in which the flow rate detection unit 205 is arranged more than the related art and improving the noise performance of the flow rate detection unit 205.

Note that the configuration of the chip package 208 included in the physical quantity detection device 20 of this embodiment is not limited to the configuration illustrated in FIGS. 4A and 4B. Hereinafter, first to fourteenth modifications of the chip package 208 included in the physical quantity detection device 20 will be described with reference to FIGS. 1 to 3 and FIGS. 5A to 18C.

Figure 5A:
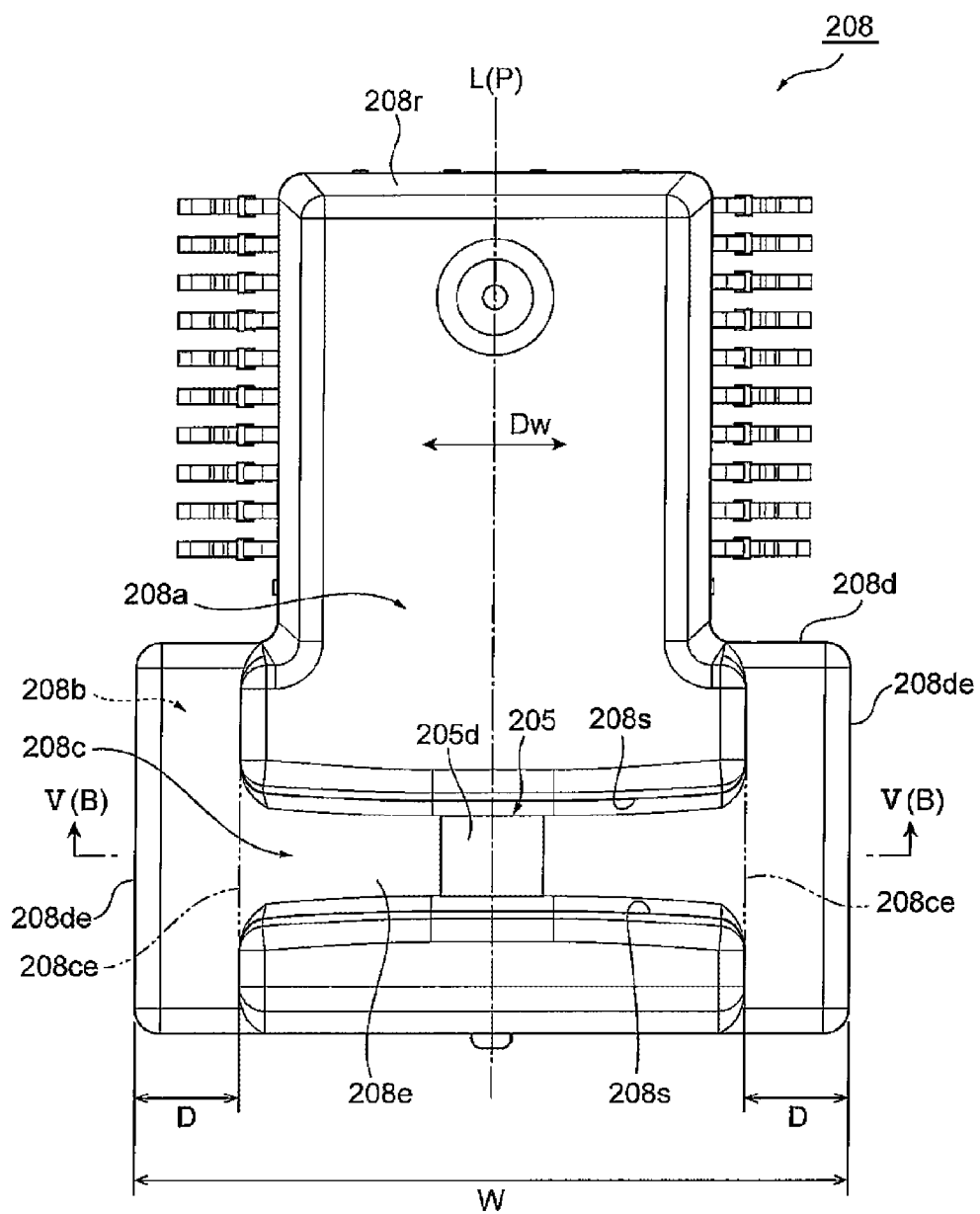
FIG. 5A is a front view illustrating a first modification of the chip package of FIG. 4A.
Figure 5B:
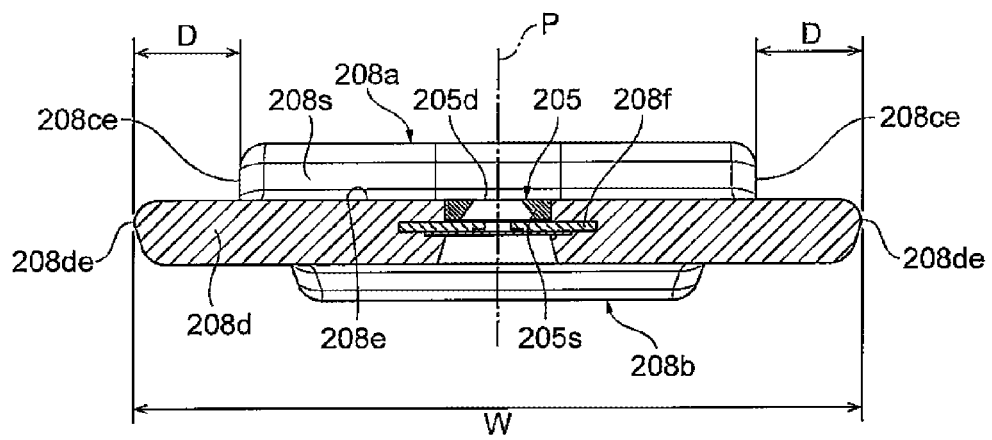
FIG. 5B is a cross-sectional view of the chip package taken along line V(B)-V(B) of FIG. 5A.

FIG. 5A is a front view illustrating a first modification of the chip package 208 in FIG. 4A. FIG. 5B is a cross-sectional view of the chip package 208 taken along line V(B)-V(B) in FIG. 5A.

In the chip package 208 illustrated in FIGS. 4A and 4B, the protruding portion of the sealing portion 208r defining the accelerating flow path 208c has a curved surface portion between the protruding portion and the separation flow portion 208d at both ends in the width direction Dw of the chip package 208. On the other hand, in the chip package 208 of the first modification illustrated in FIGS. 5A and 5B, the protruding portion of the sealing portion 208r has both end surfaces in the width direction Dw of the chip package 208 substantially orthogonal to the separation flow portion 208d, and has no curved surface portion between the protruding portion and the separation flow portion 208d. The physical quantity detection device 20 including the chip package 208 of the first modification can also achieve the same effect as the physical quantity detection device 20 including the chip package 208 illustrated in FIGS. 4A and 4B.

Figure 6A:
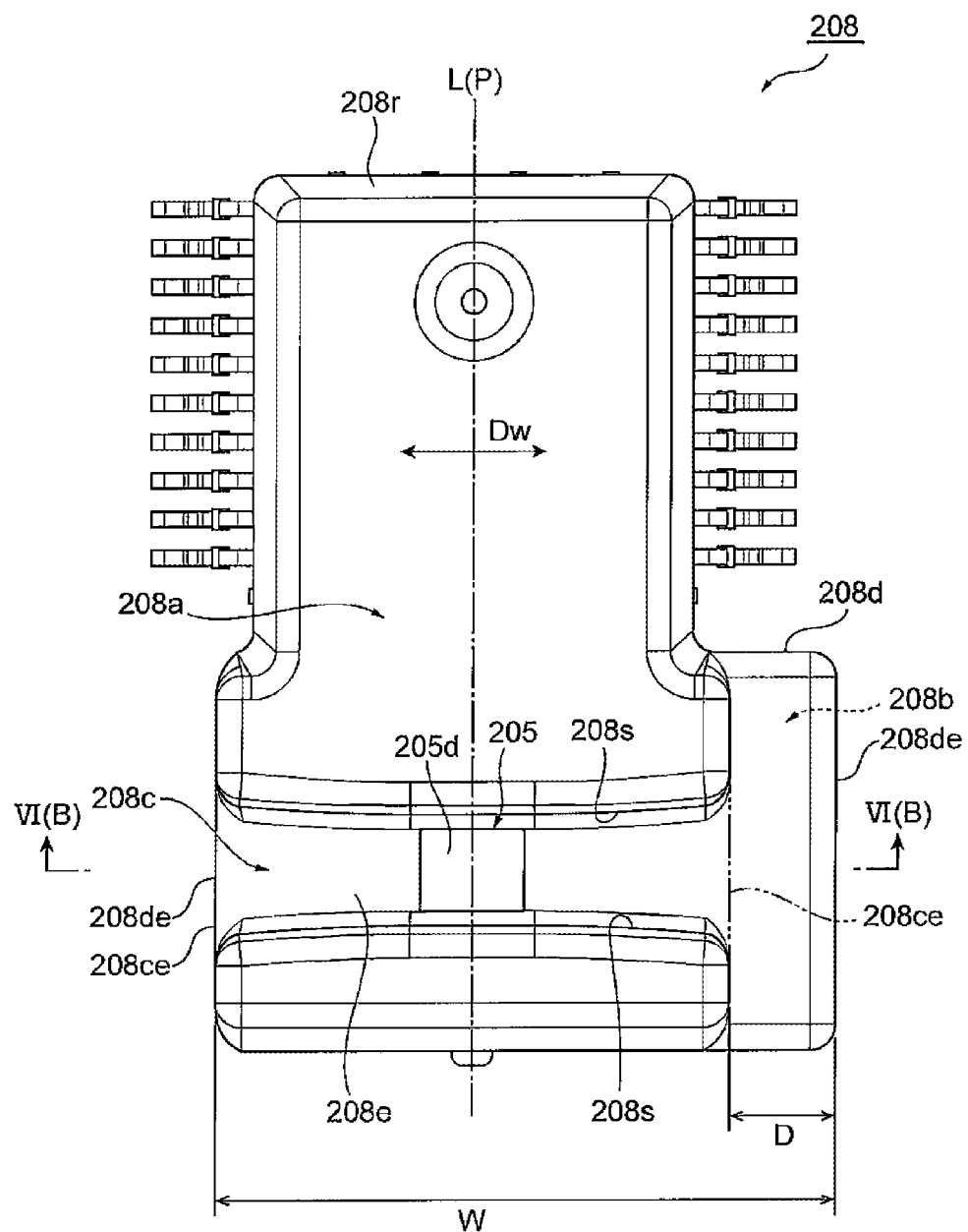
FIG. 6A is a front view illustrating a second modification of the chip package of FIG. 4A.
Figure 6B:
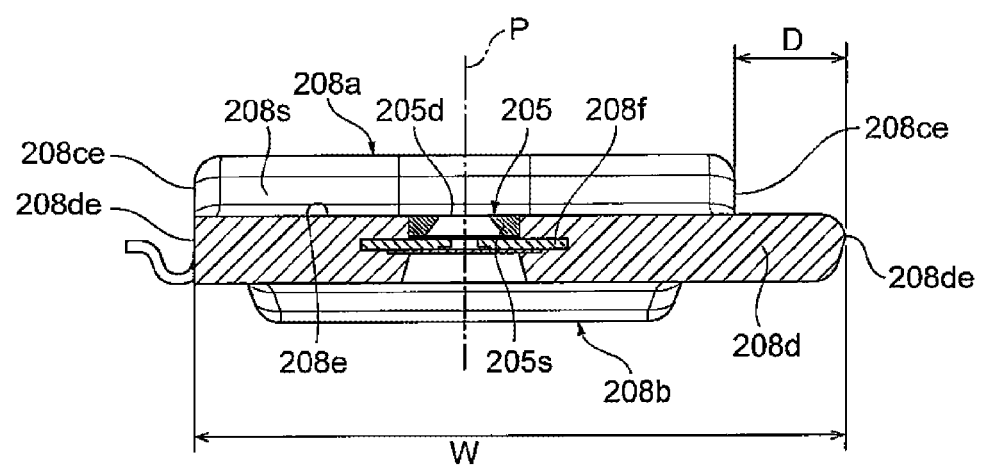
FIG. 6B is a cross-sectional view of the chip package taken along line VI(B)-VI(B) of FIG. 6A.

FIG. 6A is a front view illustrating the second modification of the chip package 208 in FIG. 4A. FIG. 6B is a cross-sectional view of the chip package 208 taken along line VI(B)-VI(B) in FIG. 6A.

The chip package 208 illustrated in FIGS. 4A and 4B has a configuration that is substantially plane-symmetric with respect to a plane P including a center line L orthogonal to the width direction Dw of the chip package 208 and parallel to the protruding direction. On the other hand, the chip package 208 of the second modification illustrated in FIGS. 6A and 6B has an asymmetric configuration with respect to the plane P including the center line L orthogonal to the width direction Dw of the chip package 208 and parallel to the protruding direction. More specifically, in the physical quantity detection device 20 according to the second modification, in the width direction Dw of the chip package 208, the one end portion 208ce of the accelerating flow path 208c and the one end portion 208de of the separation flow portion 208d are separated from each other, and the other end portion 208ce of the accelerating flow path 208c and the other end portion 208de of the separation flow portion 208d coincide with each other.

In this configuration, when the end portion in the width direction Dw of the chip package 208 where the end portion 208ce of the accelerating flow path 208c and the end portion 208de of the separation flow portion 208d coincide with each other is located on the upstream side of the measurement target gas 2, the rectifying effect before the measurement target gas 2 flows into the accelerating flow path 208c cannot be expected. However, since the end portion 208ce of the accelerating flow path 208c and the end portion 208de of the separation flow portion 208d are separated from each other on the downstream side of the measurement target gas 2, the measurement target gas 2 passing through the accelerating flow path 208c joins the measurement target gas 2 flowing through the non-measurement flow path on the non-measurement surface 208b side after being rectified by the separation flow portion 208d.

On the other hand, when the end portion in the width direction Dw of the chip package 208 where the end portion 208ce of the accelerating flow path 208c and the end portion 208de of the separation flow portion 208d coincide with each other is located on the downstream side of the measurement target gas 2, the rectifying effect after the measurement target gas 2 passes through the accelerating flow path 208c cannot be expected. However, on the upstream side of the measurement target gas 2, the end portion 208ce of the accelerating flow path 208c and the end portion 208de of the separation flow portion 208d are separated from each other. Therefore, the measurement target gas 2 divided by the separation flow portion 208d of the separation flow portion 208d flows into the accelerating flow path 208c after being rectified by the separation flow portion 208d. However, in this configuration, the amount of the backflow of the measurement target gas 2 taken in can be reduced. Therefore, it can be said that it is an effective configuration to cope with a request that does not require a backflow detection function and a detection request of only a low pulsation amplitude ratio.

Therefore, also by the physical quantity detection device including the chip package 208 according to the second modification, the flow of the measurement target gas 2 in the flow rate detection unit 205 can be stabilized and the noise performance of the flow rate detection unit 205 can be improved as compared with the case where both the end portions 208ce and 208ce of the accelerating flow path 208c and both the end portions 208de and 208de of the separation flow portion 208d coincide with each other.

Figure 7A:
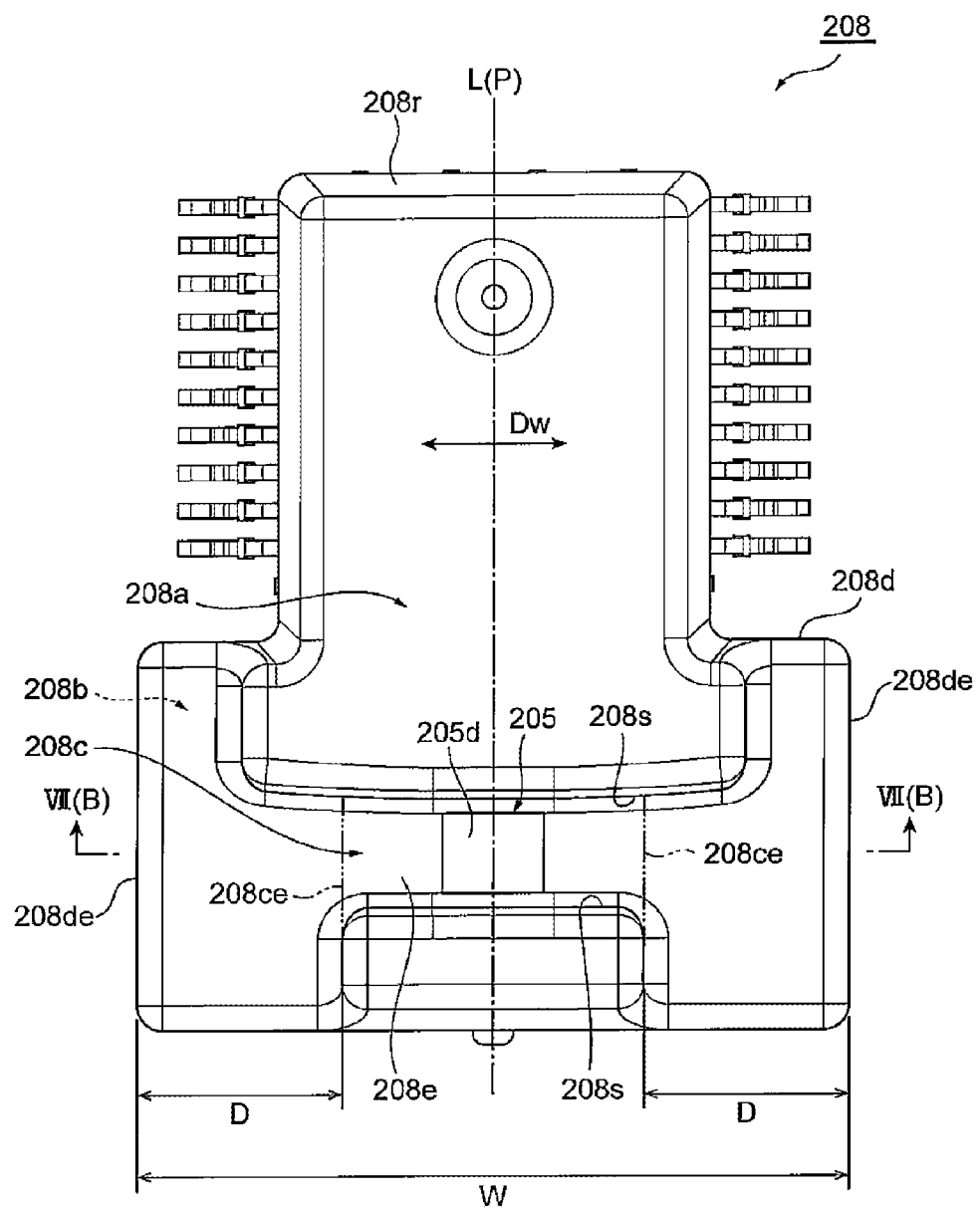
FIG. 7A is a front view illustrating a third modification of the chip package in FIG. 4A.
Figure 7B:
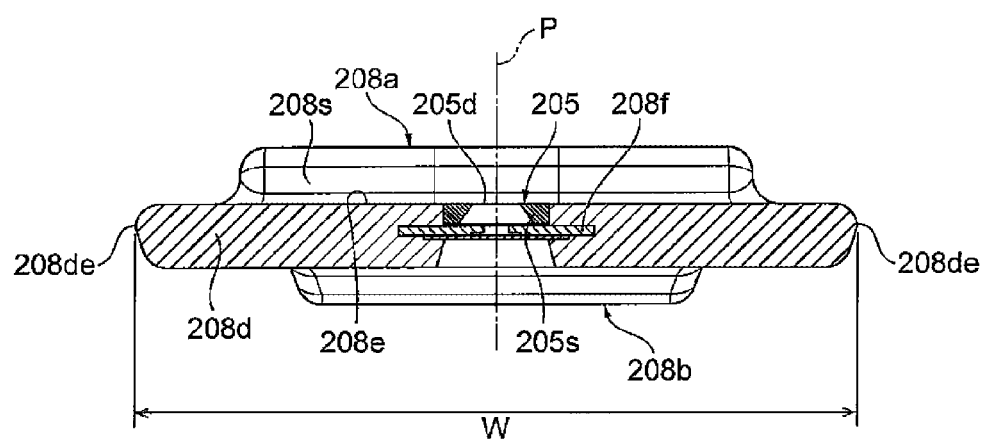
FIG. 7B is a cross-sectional view of the chip package taken along line VII(B)-VII(B) in FIG. 7A.
Figure 7C:
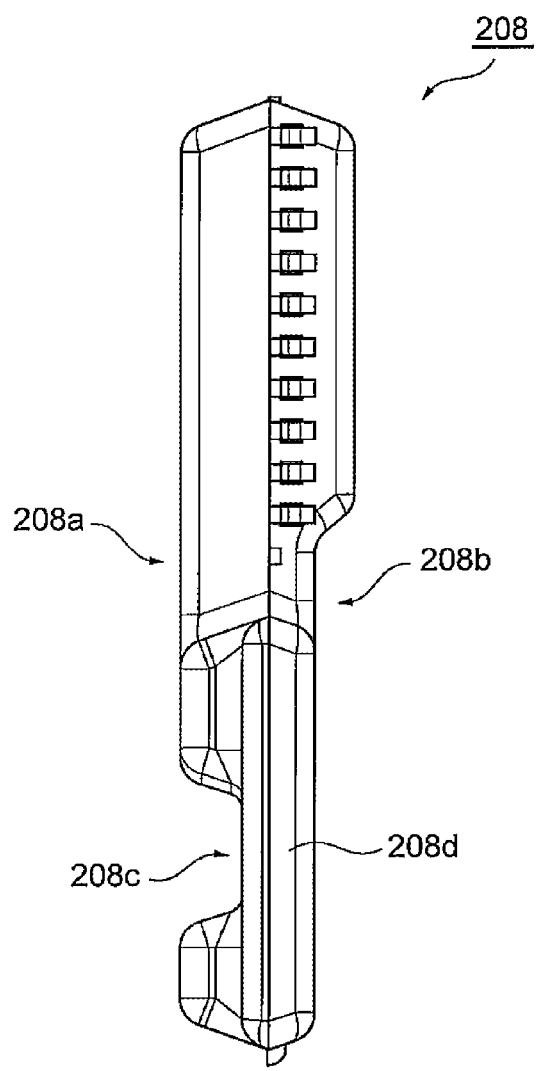
FIG. 7C is a side view of the chip package illustrated in FIG. 7A.

FIG. 7A is a front view illustrating a third modification of the chip package 208 in FIG. 4A. FIG. 7B is a cross-sectional view of the chip package taken along line VII(B)-VII(B) in FIG. 7A. FIG. 7C is a side view of the chip package 208 illustrated in FIG. 7A.

The physical quantity detection device 20 according to the third modification includes the chip package 208 illustrated in FIGS. 7A to 7C. In the chip package 208, the accelerating flow path 208c includes a pair of side wall portions 208s and 208s facing the protruding direction of the chip package 208 and extending along the width direction Dw of the chip package 208. In the chip package 208, the length of one side wall portion 208s is longer than the length of the other side wall portion 208s in the width direction Dw.

In the example illustrated in FIG. 7A, the length in the width direction Dw of the side wall portion 208s on the distal end side in the protruding direction of the chip package 208 is shorter than the length in the width direction Dw of the side wall portion 208s on the proximal end side in the protruding direction of the chip package 208. However, contrary to the example illustrated in FIG. 7A, the length of the side wall portion 208s on the proximal end side in the width direction Dw may be shorter than the length of the side wall portion 208s on the distal end side in the width direction Dw. The physical quantity detection device 20 including the chip package 208 of the third modification can also achieve the same effects as those of the physical quantity detection device 20 including the chip package 208 illustrated in FIGS. 4A and 4B.

Figure 8A:
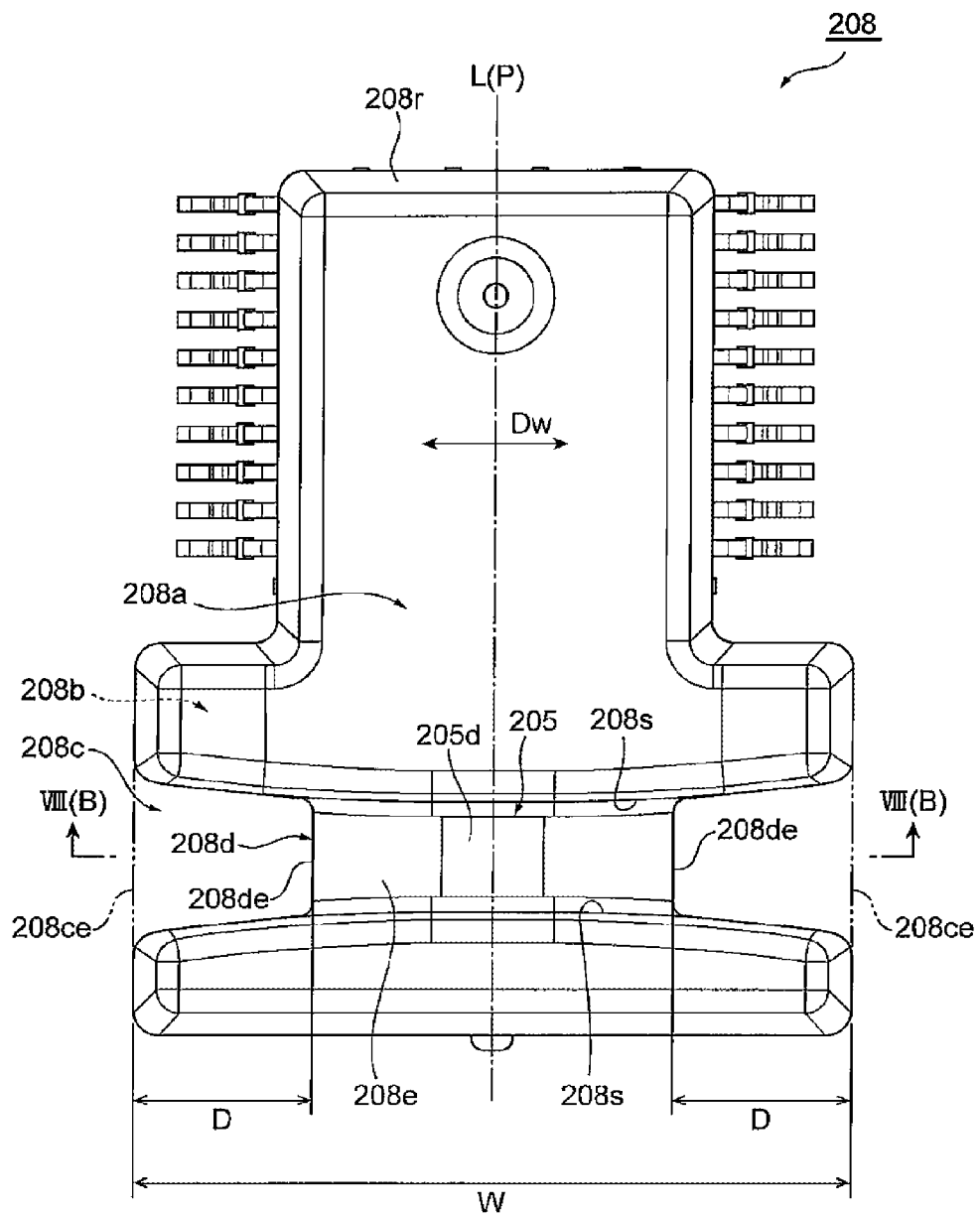
FIG. 8A is a front view illustrating a fourth modification of the chip package in FIG. 4A.
Figure 8B:
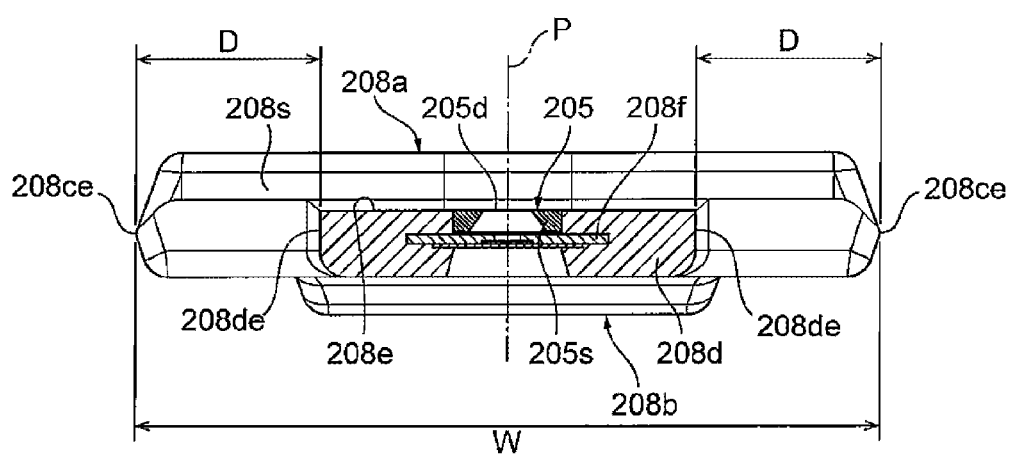
FIG. 8B is a cross-sectional view of the chip package taken along line VIII(B)-VIII(B) in FIG. 8A.
Figure 8C:
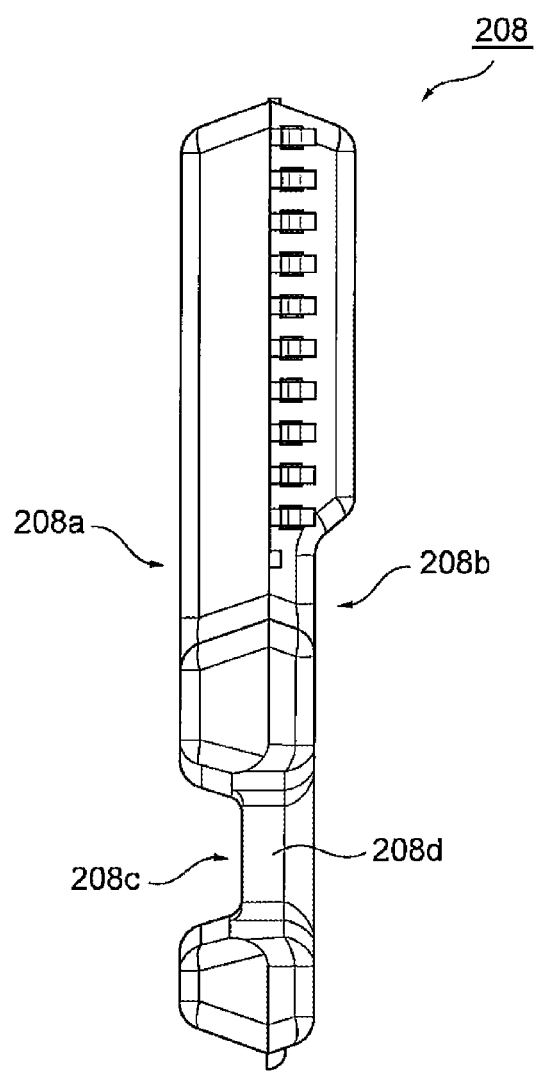
FIG. 8C is a side view of the chip package illustrated in FIG. 8A.

FIG. 8A is a front view illustrating a fourth modification of the chip package 208 in FIG. 4A. FIG. 8B is a cross-sectional view of the chip package taken along line VIII(B)-VIII(B) in FIG. 8A. FIG. 8C is a side view of the chip package 208 illustrated in FIG. 8A.

The physical quantity detection device 20 according to the fourth modification includes the chip package 208 illustrated in FIGS. 8A to 8C. In the chip package 208, both the end portions 208ce and 208ce of the accelerating flow path 208c are positioned outside both the end portions 208de and 208de of the separation flow portion 208d in the width direction Dw of the chip package 208.

With this configuration, the measurement target gas 2 flowing into the first sub-passage 234a from the inlet 231 of the physical quantity detection device 20 and further flowing into the second sub-passage 234b flows into the accelerating flow path 208c having a narrower flow path cross-sectional area than the first sub-passage 234a, and the flow velocity increases. The flow of the measurement target gas 2 whose flow velocity has increased is rectified and stabilized in the process of flowing in the width direction Dw of the chip package 208 along the side wall portion 208s. The stable measurement target gas 2 is divided into a measurement flow path facing the measurement surface 208a and a non-measurement flow path facing the non-measurement surface 208b by the separation flow portion 208d, and the flow rate is detected by the flow rate detection unit 205.

As a result, the flow of the measurement target gas 2 in the flow rate detection unit 205 can be stabilized as compared with the case where the end portion 208de of the separation flow portion 208d and the end portion 208ce of the accelerating flow path 208c are at the same position in the width direction Dw of the chip package 208. Therefore, according to the physical quantity detection device 20 including the chip package 208 of the fourth modification, similarly to the physical quantity detection device 20 including the chip package 208 illustrated in FIGS. 4A and 4B, the noise performance of the flow rate detection unit 205 can be improved as compared with the related art.

Figure 9A:
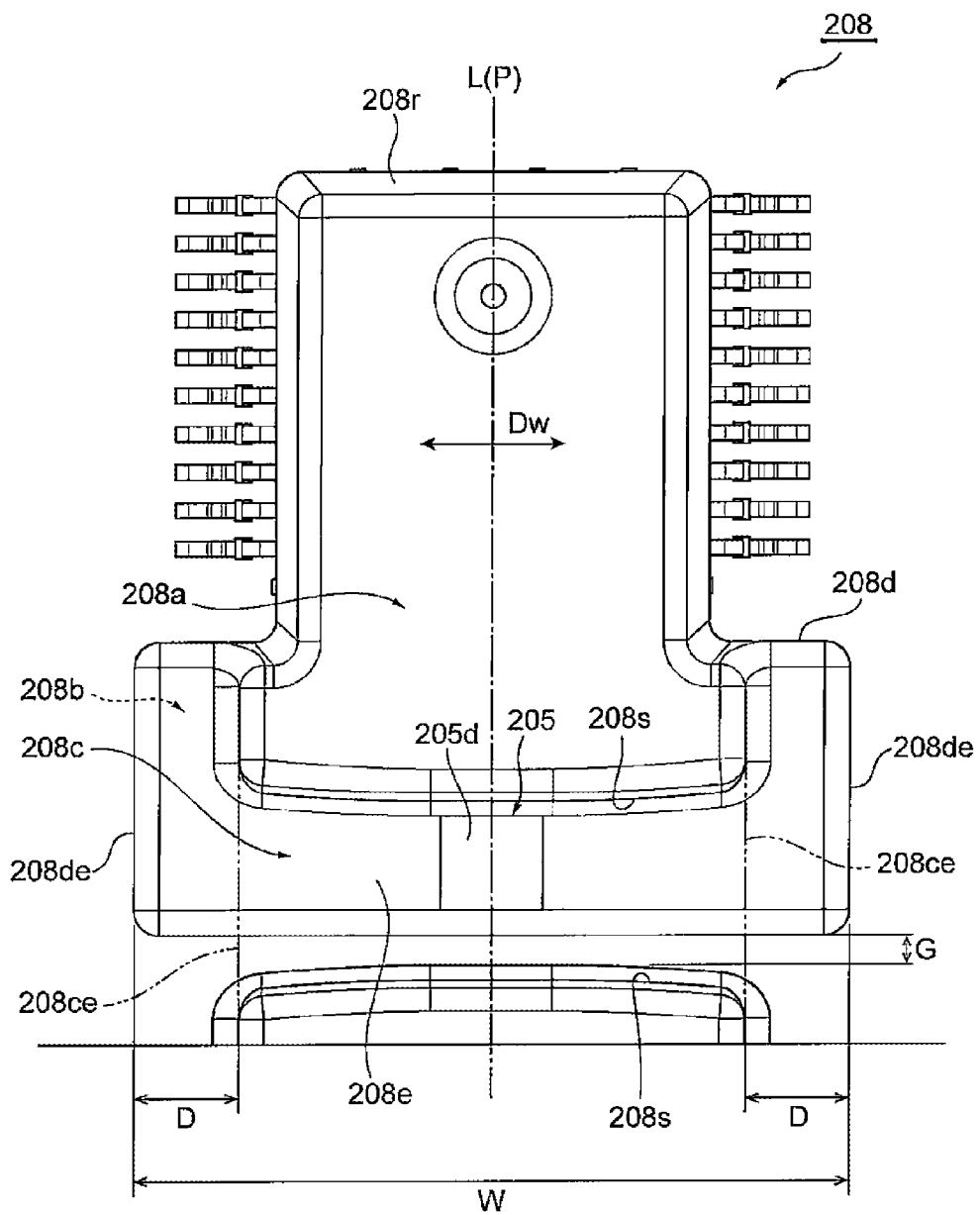
FIG. 9A is a front view illustrating a fifth modification of the chip package in FIG. 4A.
Figure 9B:
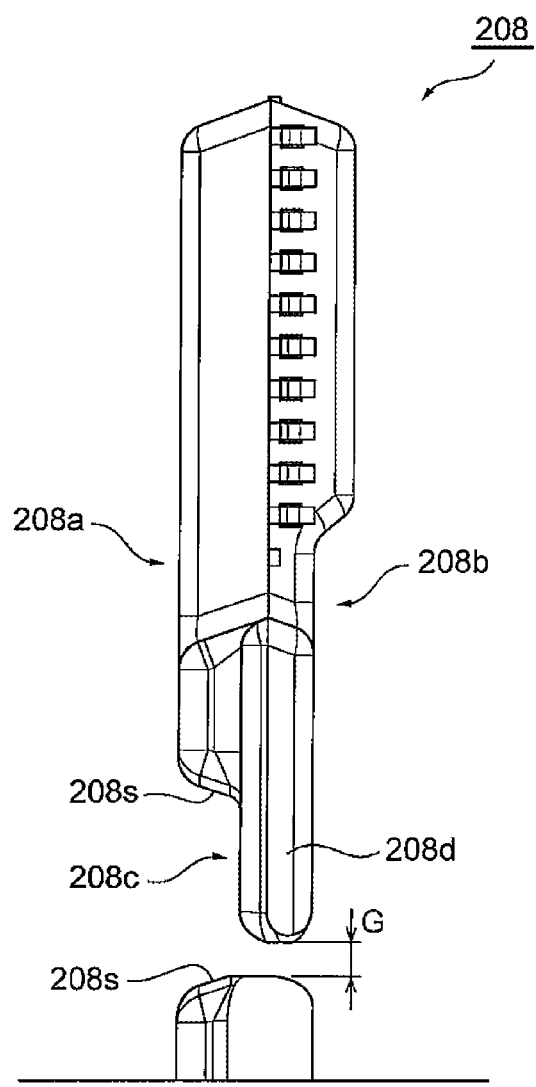
FIG. 9B is a side view of the chip package illustrated in FIG. 9A.

FIG. 9A is a front view illustrating a fifth modification of the chip package 208 in FIG. 4A. FIG. 9B is a side view of the chip package 208 illustrated in FIG. 9A.

The physical quantity detection device 20 according to the fifth modification includes a chip package 208 illustrated in FIGS. 9A and 9B. In the chip package 208, the accelerating flow path 208c includes a pair of side wall portions 208s and 208s facing the protruding direction of the chip package 208 and extending along the width direction Dw. One side wall portion 208s is provided on a wall surface of the second sub-passage 234b which is a flow path of the measurement target gas 2, and the other side wall portion 208s is provided in the chip package 208. A gap G is provided between one side wall portion 208s provided in the second sub-passage 234b and the distal end portion of the chip package 208.

That is, in the physical quantity detection device 20 according to the fifth modification, one side wall portion 208 of the pair of side wall portions 208s and 208s defining the accelerating flow path 208c is provided in the housing 201 defining the sub-passage 234 that is the flow path of the measurement target gas 2. The physical quantity detection device 20 according to the fifth modification can also achieve the same effects as those of the physical quantity detection device 20 including the chip package 208 illustrated in FIGS. 4A and 4B.

Figure 10A:
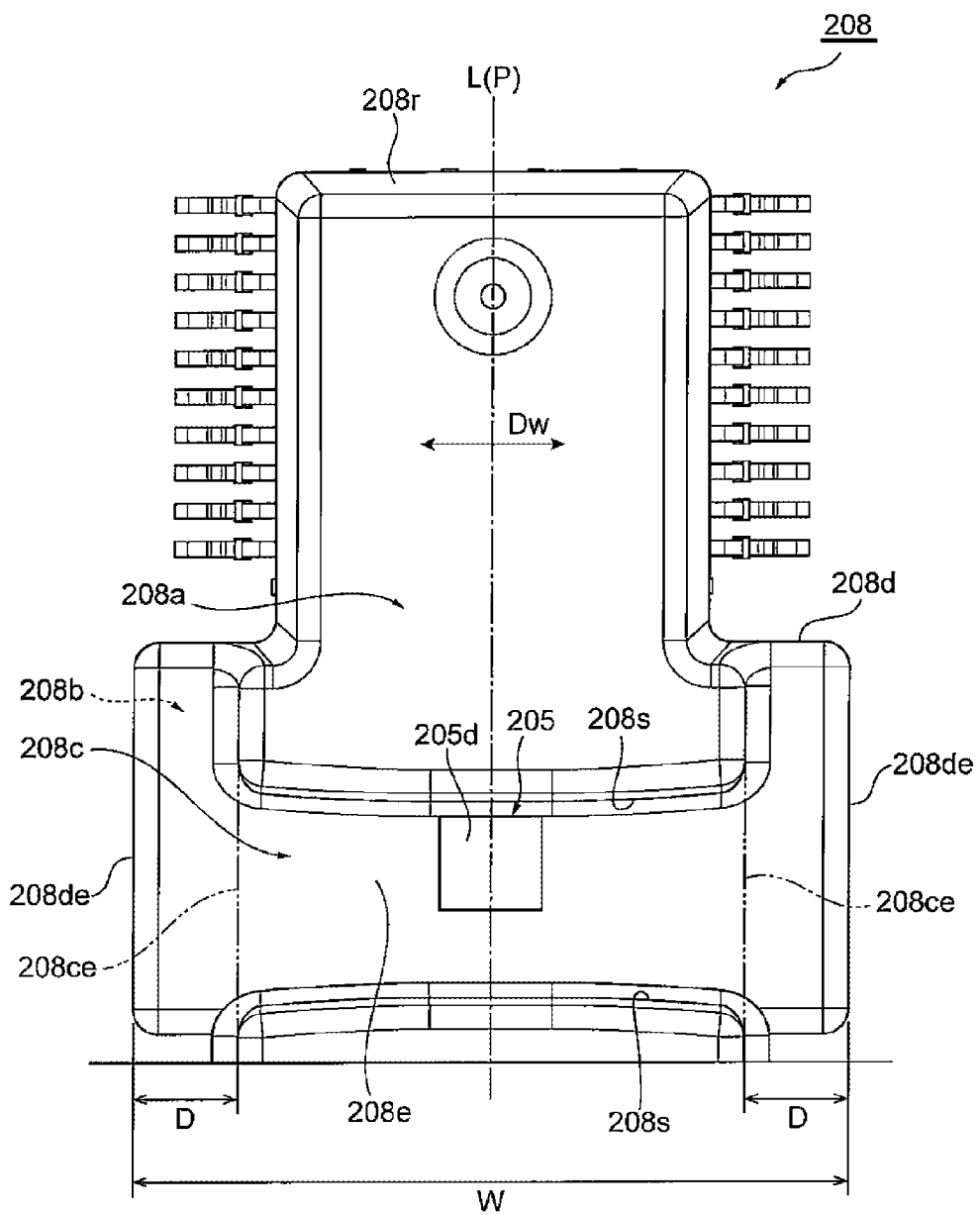
FIG. 10A is a front view illustrating a sixth modification of the chip package in FIG. 4A.
Figure 10B:
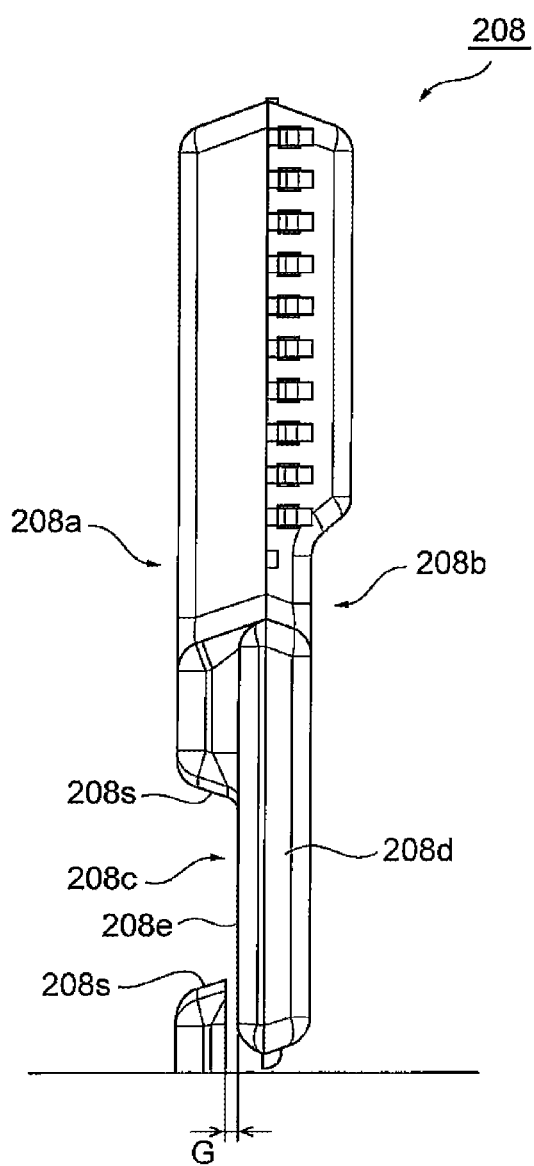
FIG. 10B is a side view of the chip package illustrated in FIG. 10A.

FIG. 10A is a front view illustrating a sixth modification of the chip package 208 in FIG. 4A. FIG. 10B is a side view of the chip package 208 illustrated in FIG. 10A.

The physical quantity detection device 20 according to the sixth modification includes the chip package 208 illustrated in FIGS. 10A and 10B. In the chip package 208, similarly to the chip package 208 of the fifth modification illustrated in FIGS. 9A and 9B, one side wall portion 208s of the pair of side wall portions 208s of the accelerating flow path 208c is provided on the wall surface of the second sub-passage 234b that is the flow path of the measurement target gas 2. Further, in the chip package 208 according to the sixth modification, one side wall portion 208s provided on the wall surface of the second sub-passage 234b and the distal end portion of the chip package 208 face each other in the thickness direction of the chip package 208.

With this configuration, the gap G is formed between the side wall portion 208s provided on the wall surface of the second sub-passage 234b and the distal end portion of the chip package 208. As a result, the water droplet attached to the bottom wall portion 208e of the accelerating flow path 208c is introduced into the gap G by the capillary phenomenon and removed from the accelerating flow path 208c. Therefore, it is possible to reduce the risk that water droplets adhere to the flow rate detection unit 205 and submersion occurs.

Figure 11A:
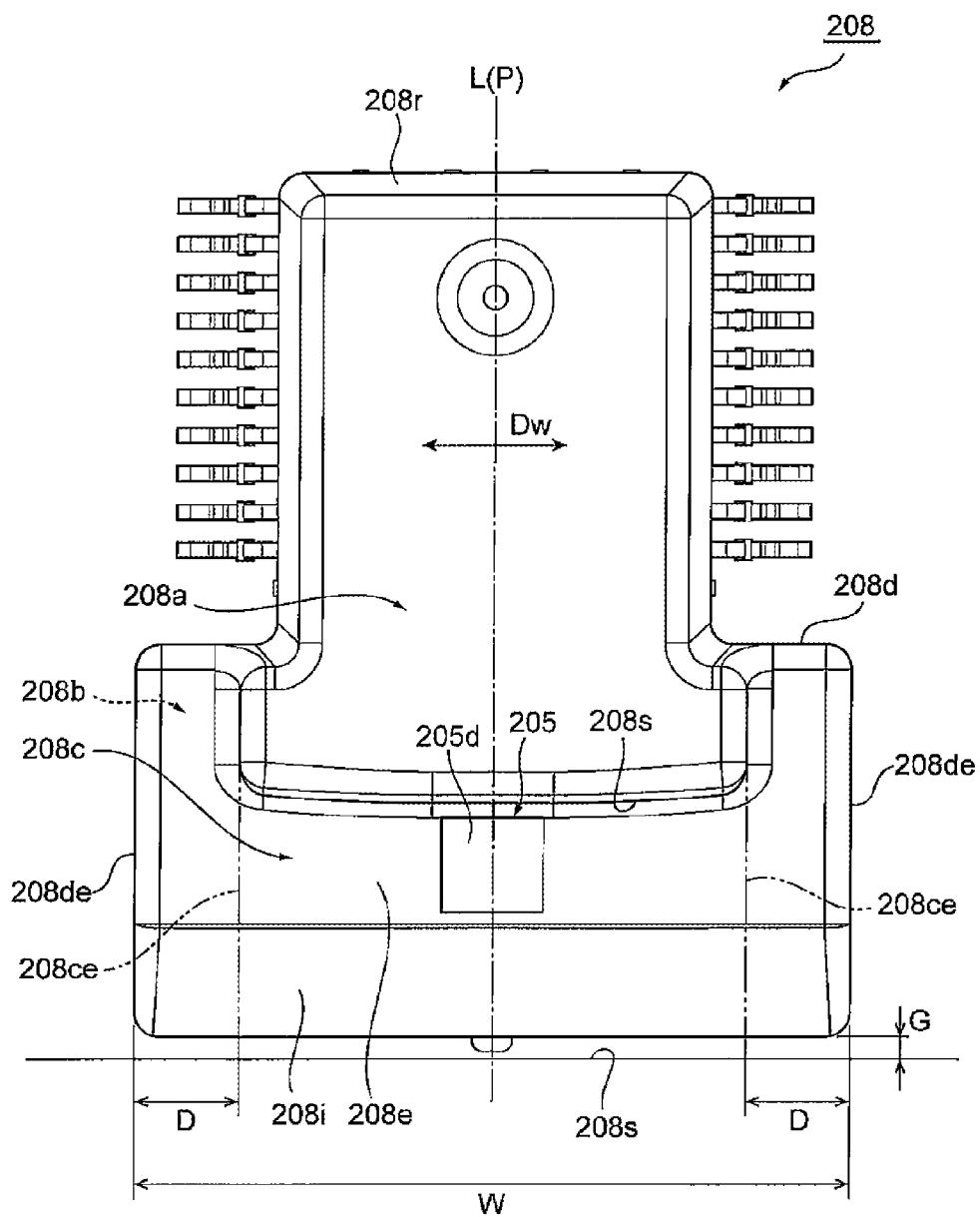
FIG. 11A is a front view illustrating a seventh modification of the chip package in FIG. 4A.
Figure 11B:
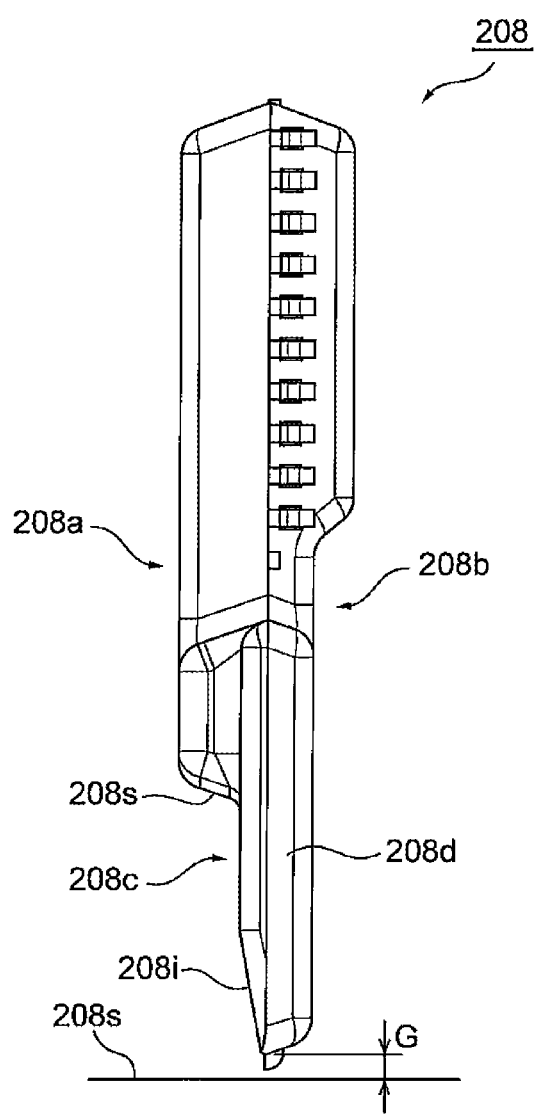
FIG. 11B is a side view of the chip package illustrated in FIG. 11A.

FIG. 11A is a front view illustrating a seventh modification of the chip package 208 in FIG. 4A. FIG. 11B is a side view of the chip package 208 illustrated in FIG. 11A.

The physical quantity detection device 20 according to the seventh modification includes the chip package 208 illustrated in FIGS. 11A and 11B. In the chip package 208, the accelerating flow path 208c includes a pair of side wall portions 208s and 208s facing the protruding direction of the chip package 208 and extending along the width direction Dw of the chip package 208. Among the pair of side wall portions 208s and 208s, one side wall portion 208s is a wall surface of the second sub-passage 234b which is a flow path of the measurement target gas 2. The distal end portion of the chip package 208 has the gap G with one side wall portion 208s which is a wall surface of the second sub-passage 234b, and has an inclined surface 208i inclined so as to approach the non-measurement surface 208b as approaching the one side wall portion 208s.

With this configuration, even when a water droplet adheres to the bottom wall portion 208e of the accelerating flow path 208c, for example, the water droplet can be moved toward the side wall portion 208s, which is the wall surface of the second sub-passage 234b, along the inclined surface 208i by the action of gravity. As a result, the water droplet attached to the bottom wall portion 208e of the accelerating flow path 208c is quickly removed, and the risk that the water droplet is attached to the flow rate detection unit 205 and submerged can be reduced.

Figure 12A:
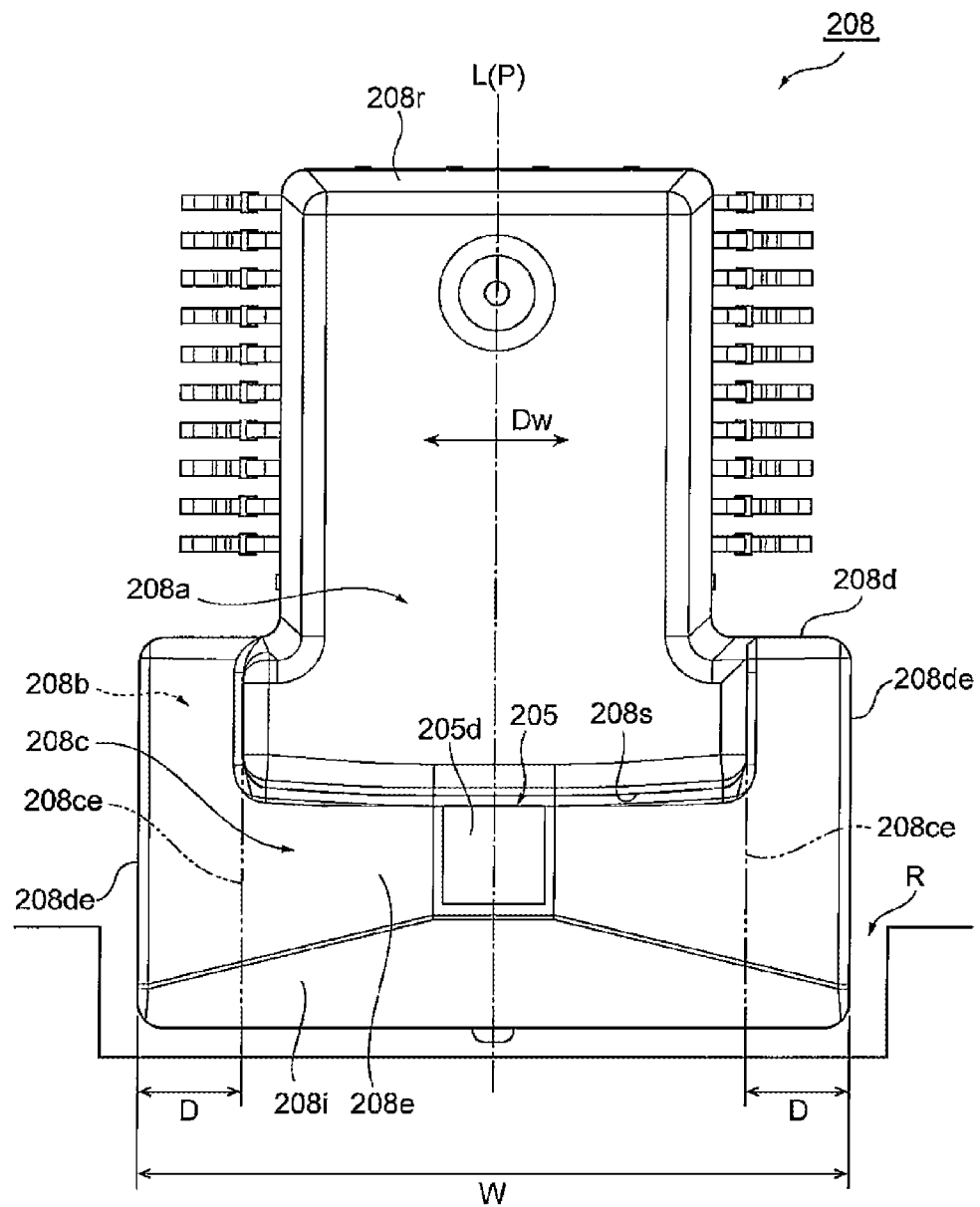
FIG. 12A is a front view illustrating an eighth modification of the chip package in FIG. 4A.
Figure 12B:
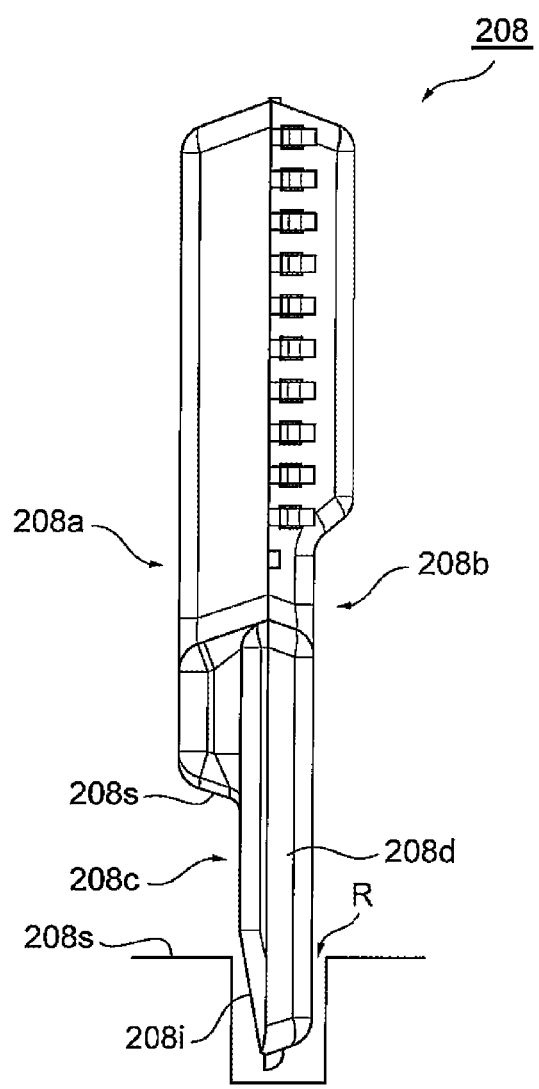
FIG. 12B is a side view of the chip package illustrated in FIG. 12A.

FIG. 12A is a front view illustrating an eighth modification of the chip package 208 in FIG. 4A. FIG. 12B is a side view of the chip package 208 illustrated in FIG. 12A.

The physical quantity detection device 20 according to the eighth modification includes the chip package 208 illustrated in FIGS. 12A and 12B. In the chip package 208, similarly to the chip package 208 according to the seventh modification illustrated in FIGS. 11A and 11B, one side wall portion 208s of the pair of side wall portions 208s and 208s defining the accelerating flow path 208c is a wall surface of the second sub-passage 234b which is a flow path of the measurement target gas 2. The distal end portion of the chip package 208 of the eighth modification is accommodated in a recess R provided on the wall surface of the second sub-passage 234b. As described above, even when the recess R is provided in the second sub-passage 234b of the housing 201, the same effects as those of the chip package 208 according to the seventh modification can be obtained.

Figure 13:
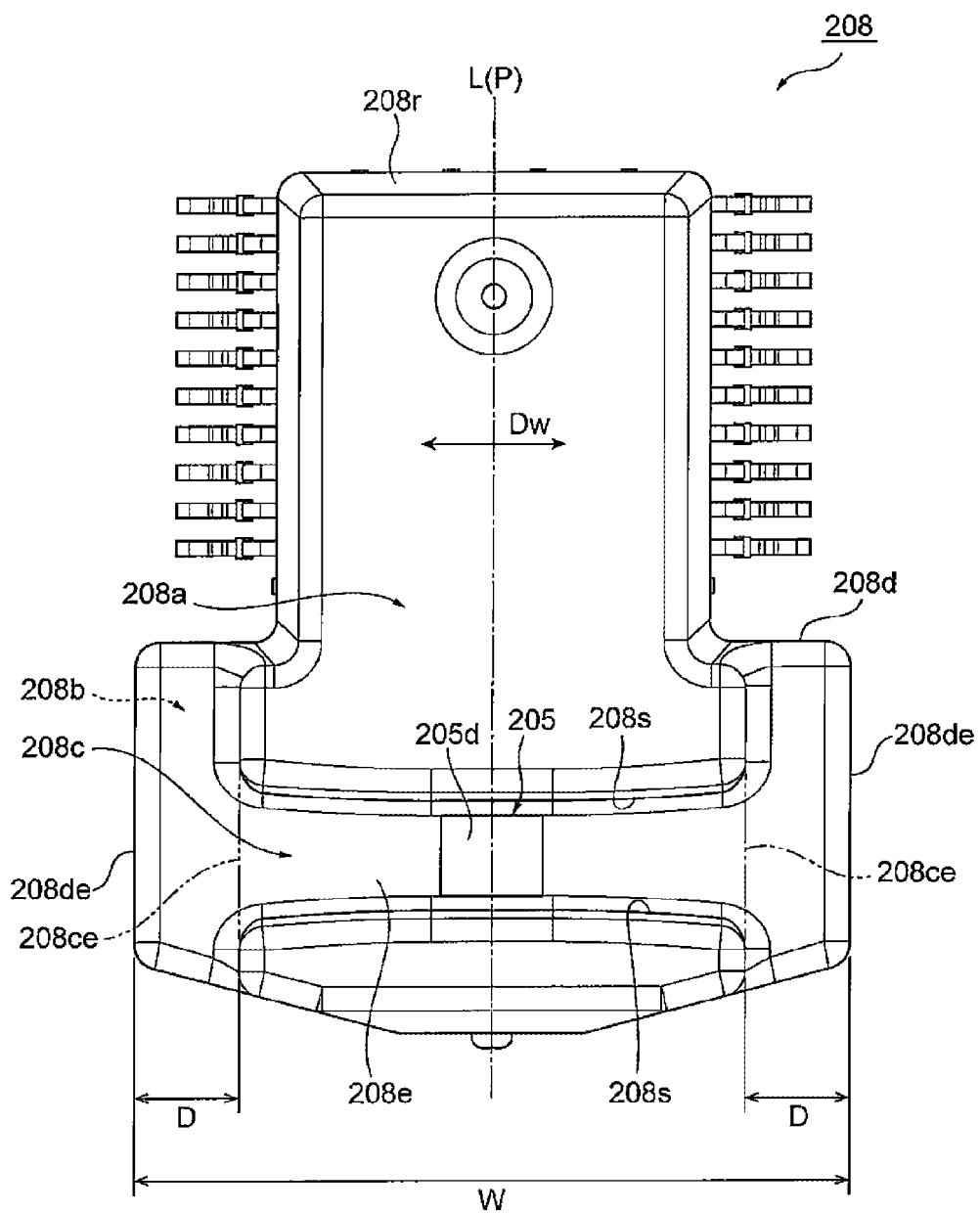
FIG. 13 is a front view illustrating a ninth modification of the chip package in FIG. 4A.
Figure 14:
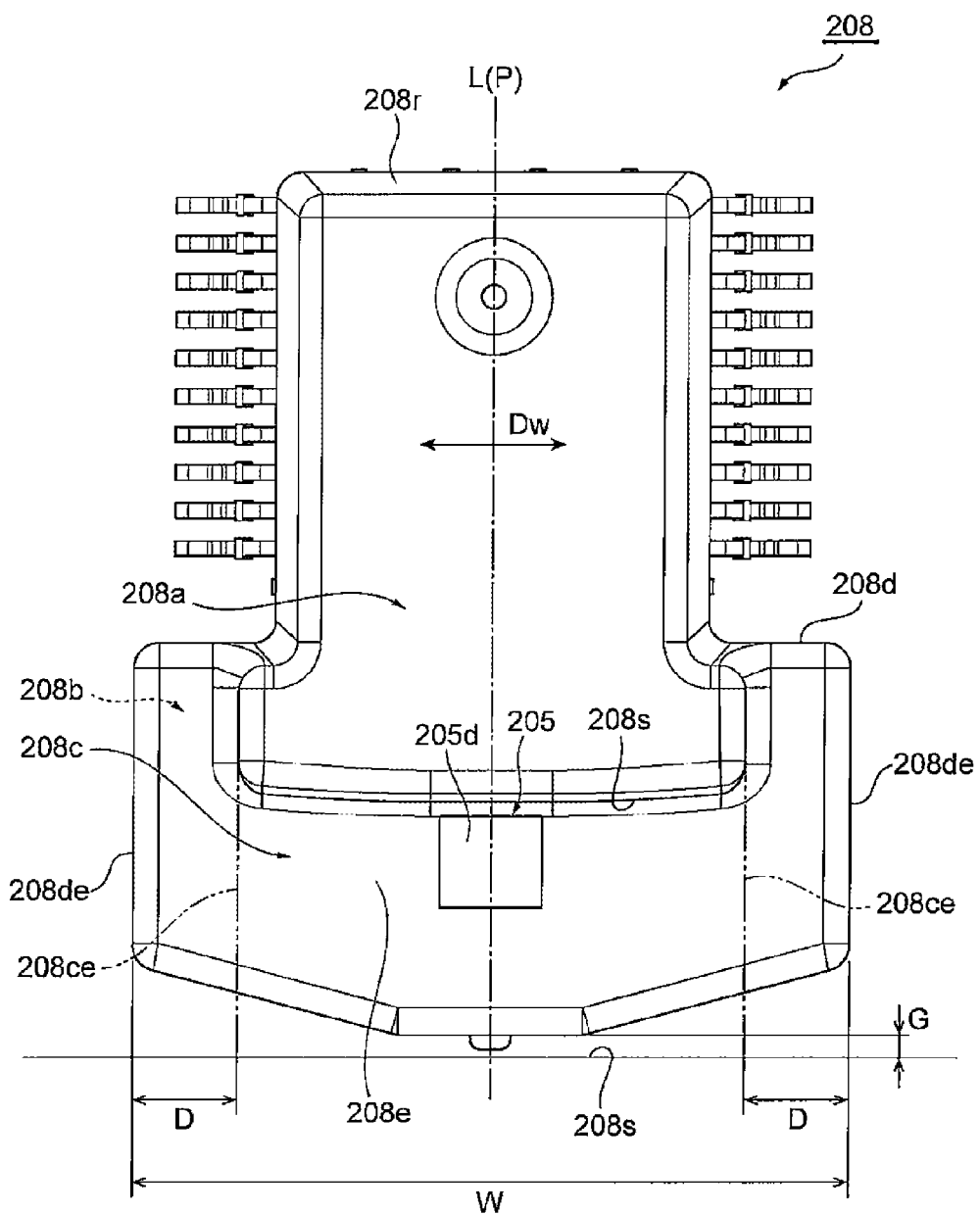
FIG. 14 is a front view illustrating a tenth modification of the chip package of FIG. 4A.

FIG. 13 is a front view illustrating a ninth modification of the chip package of FIG. 4A. FIG. 14 is a front view illustrating a tenth modification of the chip package of FIG. 4A.

The physical quantity detection device 20 according to the ninth modification includes the chip package 208 illustrated in FIG. 13, and the physical quantity detection device 20 according to the tenth modification includes the chip package 208 illustrated in FIG. 14. In the chip package 208 according to the tenth modification illustrated in FIG. 14, similarly to the chip package 208 according to the eighth modification illustrated in FIG. 11A, one side wall portion 208s of the pair of side wall portions 208s defining the accelerating flow path 208c is a wall surface of the second sub-passage 234b which is a flow path of the measurement target gas 2. The distal end portion in the protruding direction of the chip package 208 according to the ninth modification and the tenth modification has a tapered shape in which the dimension in the width direction Dw, that is, the width W decreases toward the tip.

With this configuration, the water droplet attached to the distal end portion of the chip package 208 moves along the slope of the tapered distal end portion. As a result, the water droplet attached to the distal end portion of the chip package 208 can be collected at the distal end portion of the tapered distal end portion, and the water droplet is efficiently removed from the distal end portion of the chip package 208 by its own weight. As a result, the water droplet attached to the distal end portion of the chip package 208 is quickly removed, and the risk that the water droplet is attached to the flow rate detection unit 205 and submerged can be reduced.

Figure 15A:
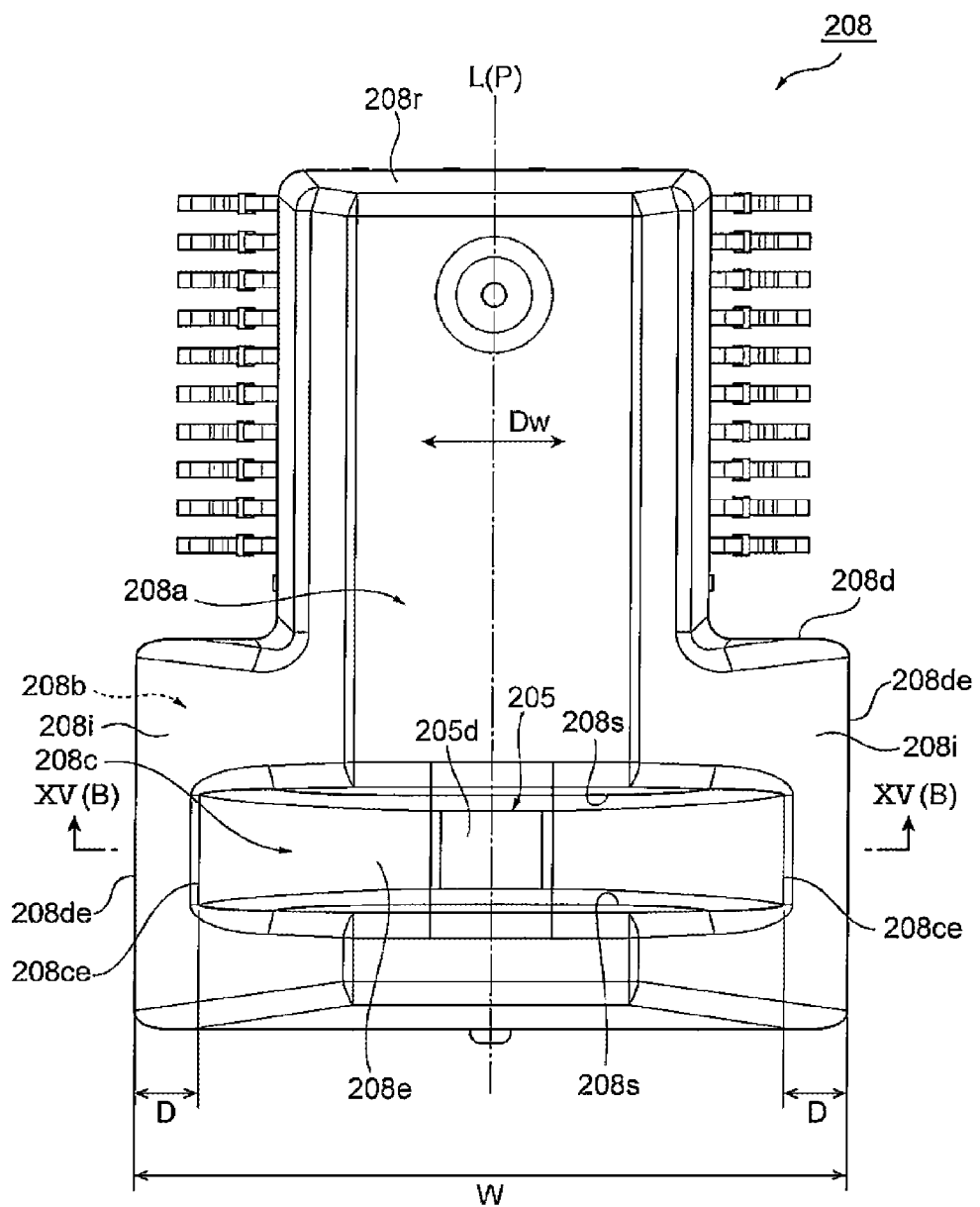
FIG. 15A is a front view illustrating a eleventh modification of the chip package in FIG. 4A.
Figure 15B:
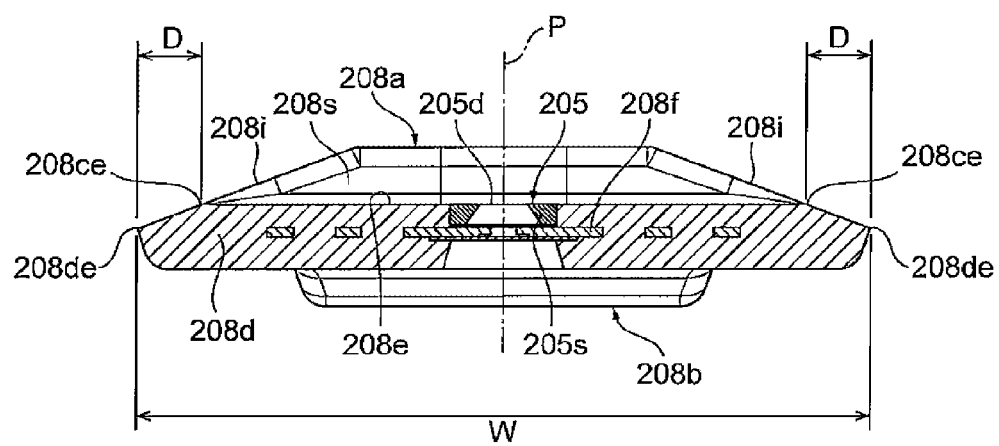
FIG. 15B is a cross-sectional view of the chip package taken along line XV(B)-XV(B) in FIG. 15A.
Figure 15C:
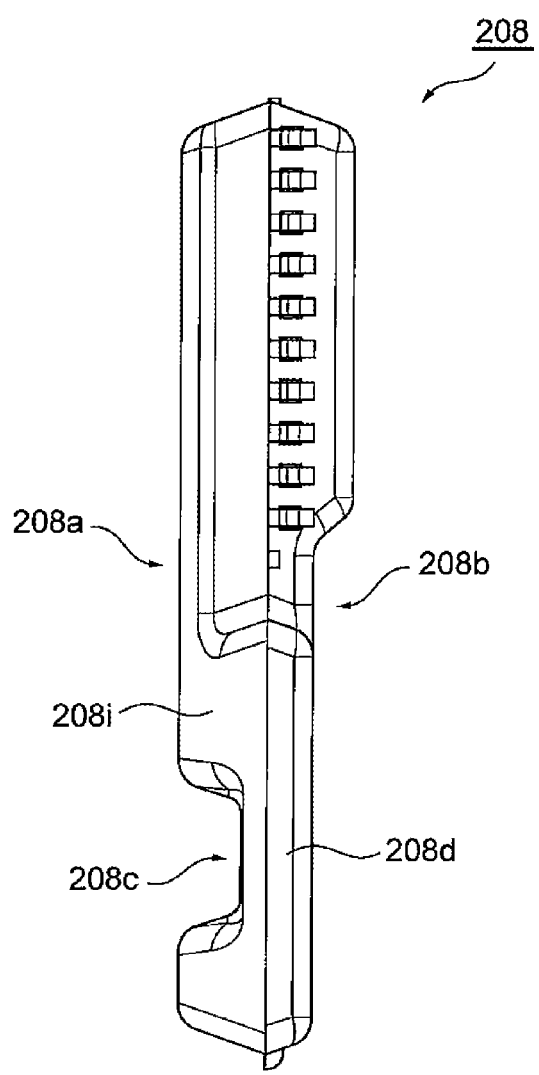
FIG. 15C is a side view of the chip package illustrated in FIG. 15A.

FIG. 15A is a front view illustrating an eleventh modification of the chip package of FIG. 4A. FIG. 15B is a cross-sectional view of the chip package 208 taken along line XV(B)-XV(B) in FIG. 15A. FIG. 15C is a side view of the chip package 208 illustrated in FIG. 13A.

The physical quantity detection device 20 according to the eleventh modification includes the chip package 208 illustrated in FIGS. 15A to 15C. The chip package 208 has inclined surfaces 208i on both sides in the width direction Dw of the measurement surface 208a. These inclined surfaces 208i are inclined so as to approach the non-measurement surface 208b as approaching the edge of the chip package 208 in the width direction Dw.

With this configuration, it is possible to make it difficult for water droplets to adhere to the inclined surface 208i of the chip package 208. In addition, it is possible to reduce the pressure loss of the second sub-passage 234b which is the flow path of the measurement target gas 2 and to increase the flow velocity of the measurement target gas 2 flowing through the second sub-passage 234b.

Figure 16A:
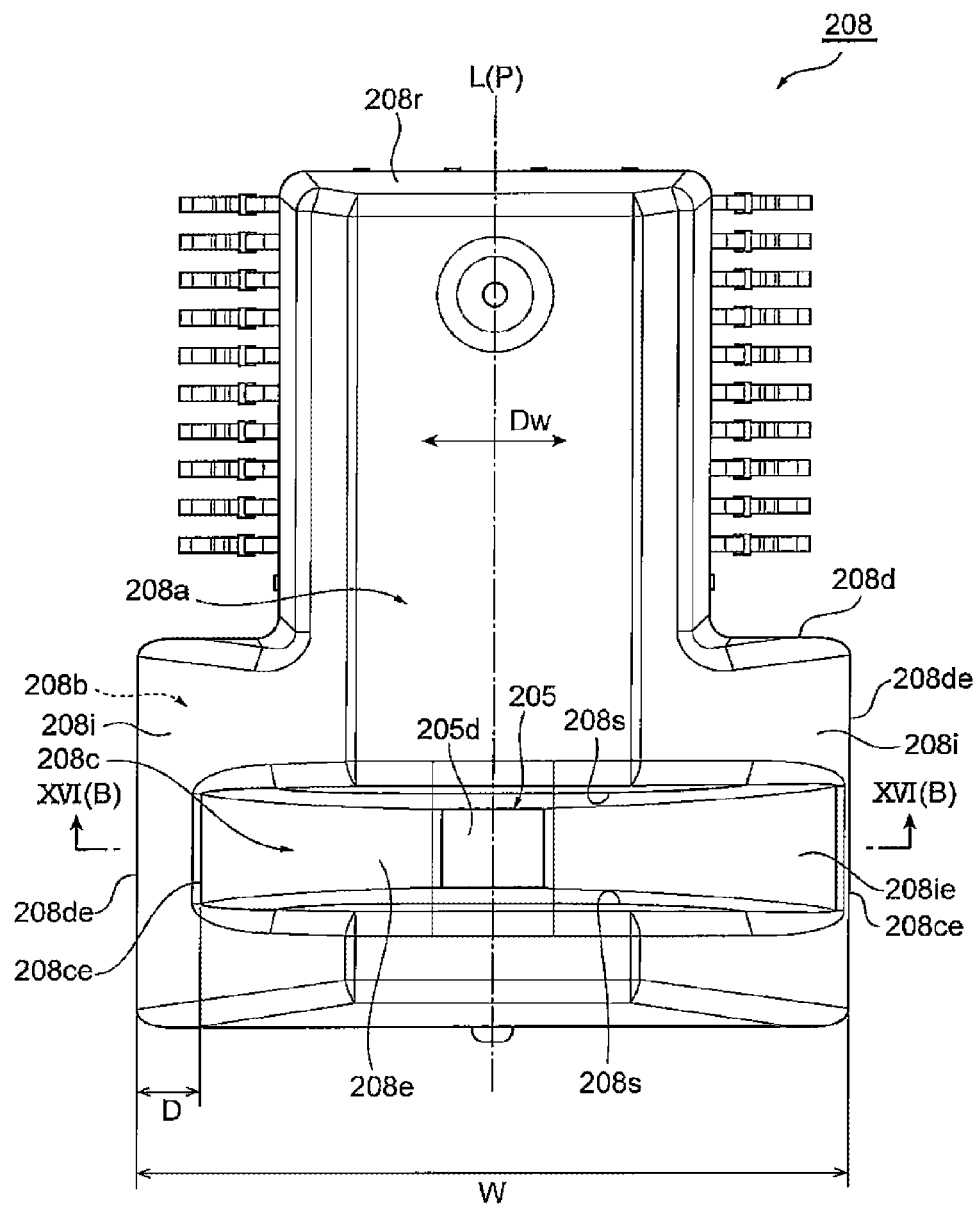
FIG. 16A is a front view illustrating a twelfth modification of the chip package in FIG. 4A.
Figure 16B:
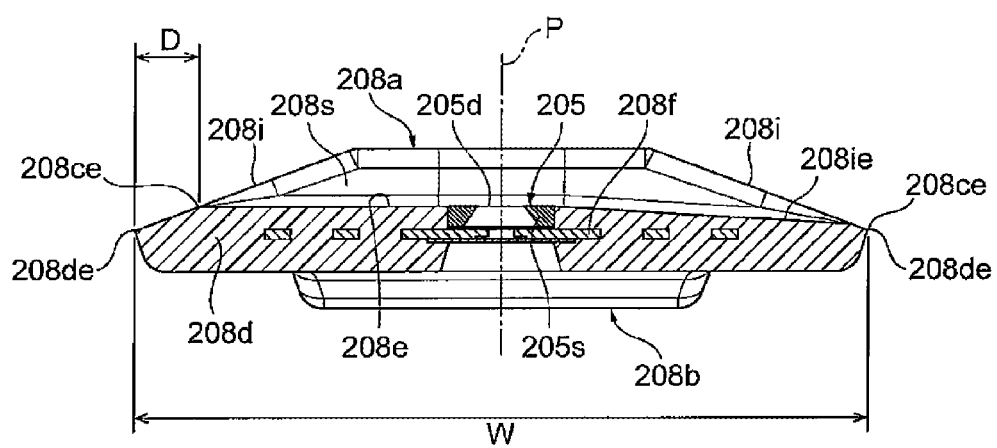
FIG. 16B is a cross-sectional view of the chip package taken along line XVI(B)-XVI(B) in FIG. 16A.

FIG. 16A is a front view illustrating a twelfth modification of the chip package 208 in FIG. 4A. FIG. 16B is a cross-sectional view of the chip package 208 taken along line XVI(B)-XVI(B) in FIG. 16A.

The physical quantity detection device 20 according to the twelfth modification includes the chip package 208 illustrated in FIGS. 16A and 16B. In the chip package 208, similarly to the chip package 208 according to the second modification illustrated in FIG. 6A, in the width direction Dw, the one end portion 208ce of the accelerating flow path 208c and the one end portion 208de of the separation flow portion 208d are separated from each other, and the other end portion 208ce of the accelerating flow path 208c and the other end portion 208de of the separation flow portion 208d coincide with each other.

In addition, in the physical quantity detection device 20 according to the twelfth modification, the chip package 208 has the inclined surfaces 208i on both sides in the width direction Dw of the measurement surface 208a, similarly to the chip package 208 according to the eleventh modification illustrated in FIGS. 15A to 15C. The inclined surface 208i is inclined so as to approach the non-measurement surface 208b as approaching the edge of the chip package 208 in the width direction Dw. In addition, the accelerating flow path 208c includes the pair of side wall portions 208s facing the protruding direction of the chip package 208 and extending along the width direction Dw, and the bottom wall portion 208e between the pair of side wall portions 208s. In the chip package 208 according to the twelfth modification, the bottom wall portion 208e has an inclined bottom surface 208ie inclined so as to approach the non-measurement surface 208b as approaching the end portion 208ce of the end portion 208ce matching the end portion 208de of the separation flow portion 208d. With this configuration, it is possible to improve the rectification effect of the measurement target gas 2 flowing through the accelerating flow path 208c and to reduce the noise of the flow rate detection unit 205.

Figure 17A:
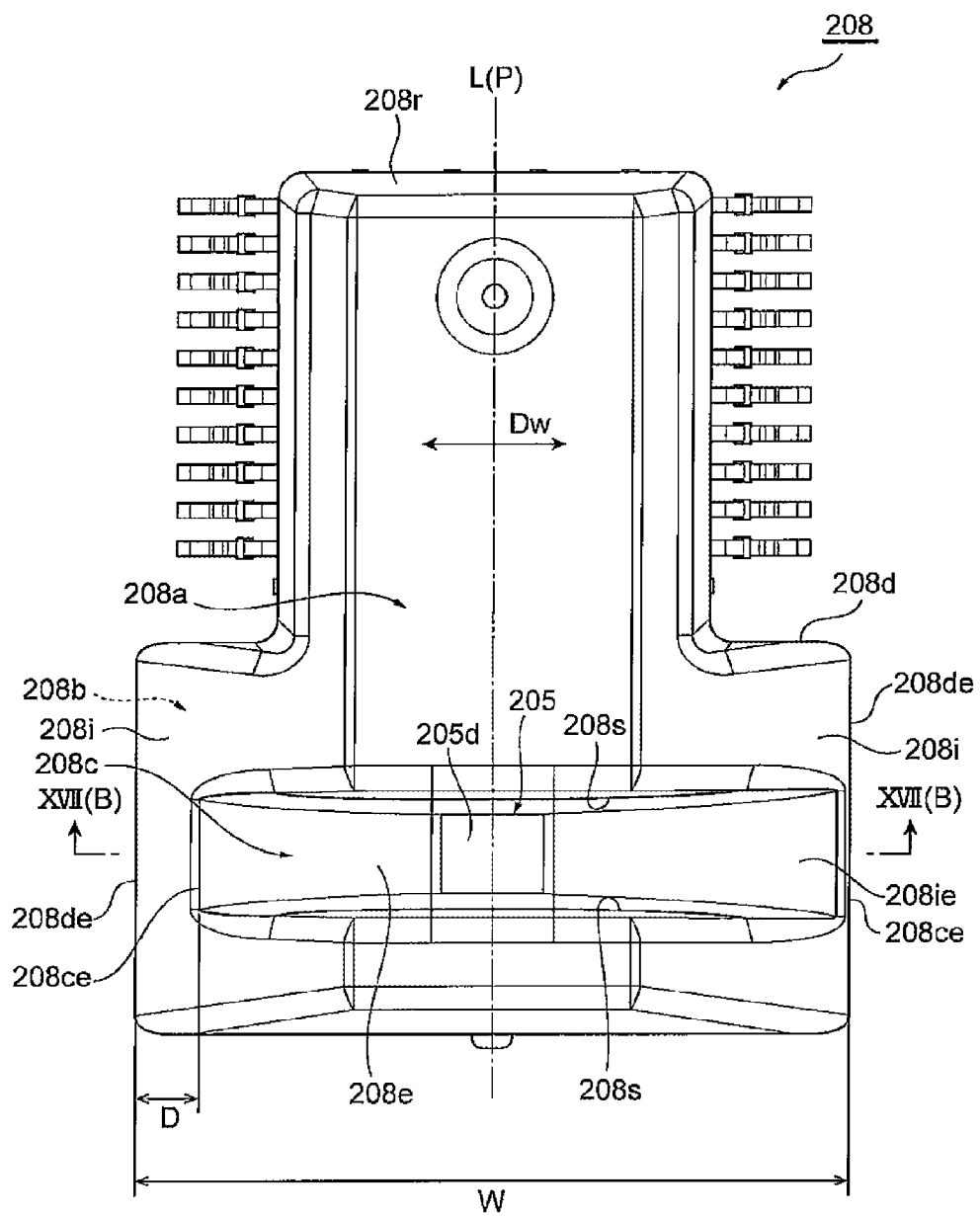
FIG. 17A is a front view illustrating a thirteenth modification of the chip package in FIG. 4A.
Figure 17B:
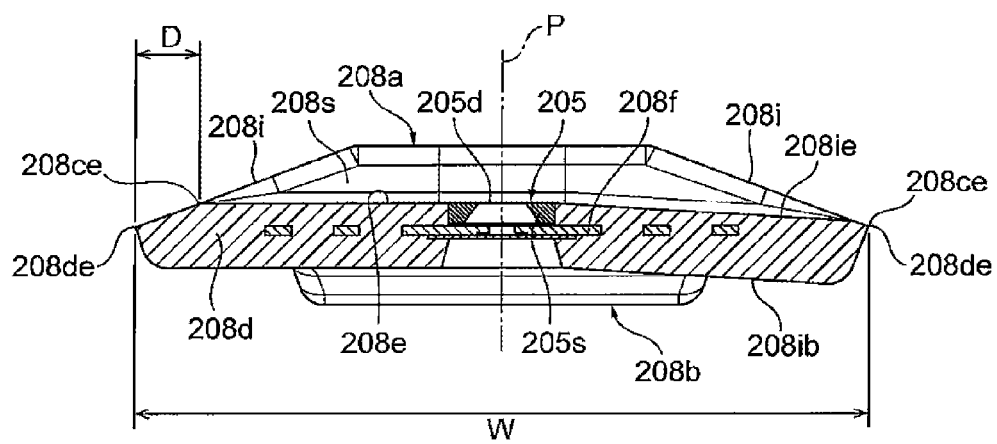
FIG. 17B is a cross-sectional view of the chip package taken along line XVII(B)-XVII(B) in FIG. 17A.

FIG. 17A is a front view illustrating a thirteenth modification of the chip package 208 in FIG. 4A. FIG. 17B is a cross-sectional view of the chip package 208 taken along line XVII(B)-XVII(B) in FIG. 17A.

Figure 17C:
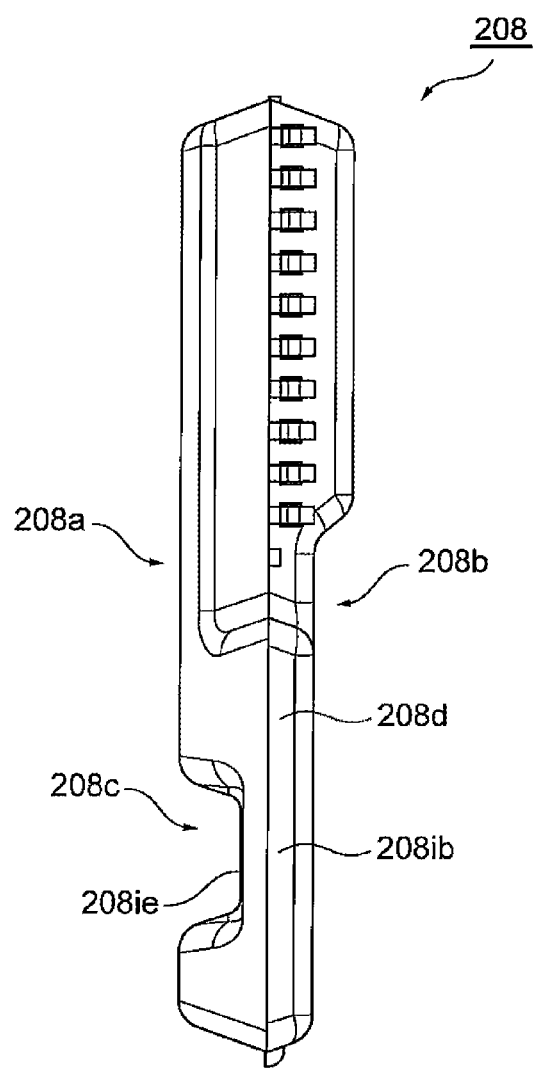
FIG. 17C is a side view of the chip package illustrated in FIG. 17A.
Figure 17D:
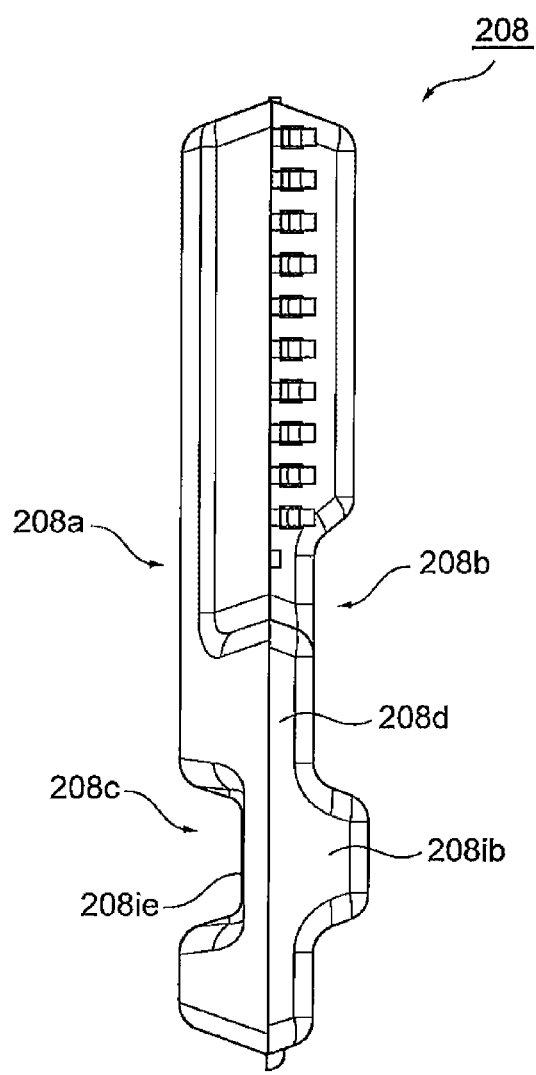
FIG. 17D is a side view illustrating a modification of the chip package of FIG. 17C.

FIG. 17C is a side view of the chip package 208 illustrated in FIG. 17A. FIG. 17D is a side view illustrating a modification of the chip package 208 of FIG. 17C.

The physical quantity detection device 20 according to a thirteenth modification includes the chip package 208 illustrated in FIGS. 17A to 17D. The chip package 208 has an inclined surface 208ib along the inclined bottom surface 208ie on the non-measurement surface 208b on the opposite side of the inclined bottom surface 208ie. With this configuration, the flow of the measurement target gas 2 can be adjusted by changing the ratio D1/D2 between a cross-sectional area D1 of the measurement flow path on the measurement surface 208a side and a cross-sectional area D2 of the measurement target flow path on the non-measurement surface 208b side.

Figure 18A:
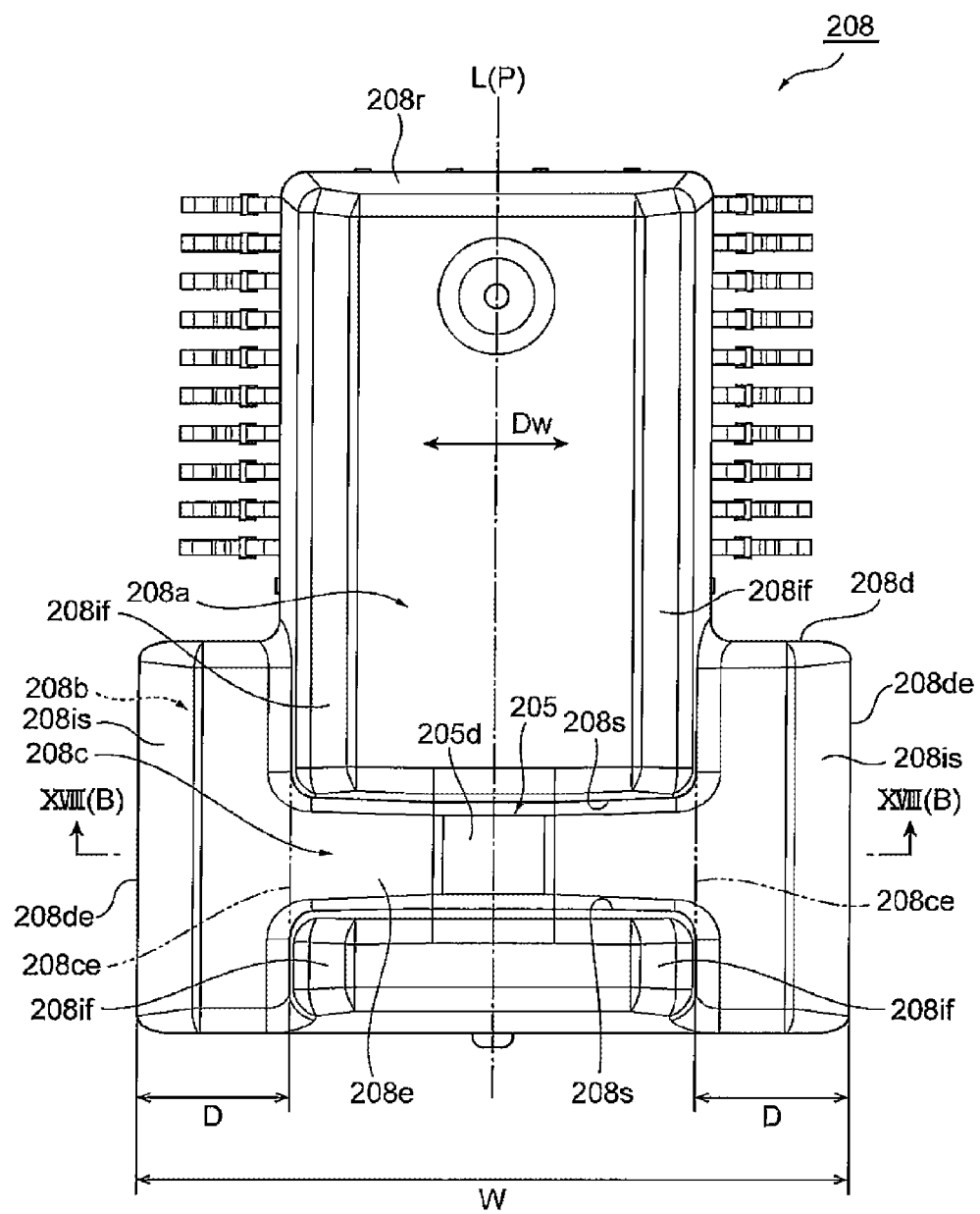
FIG. 18A is a front view illustrating a fourteenth modification of the chip package in FIG. 4A.
Figure 18B:
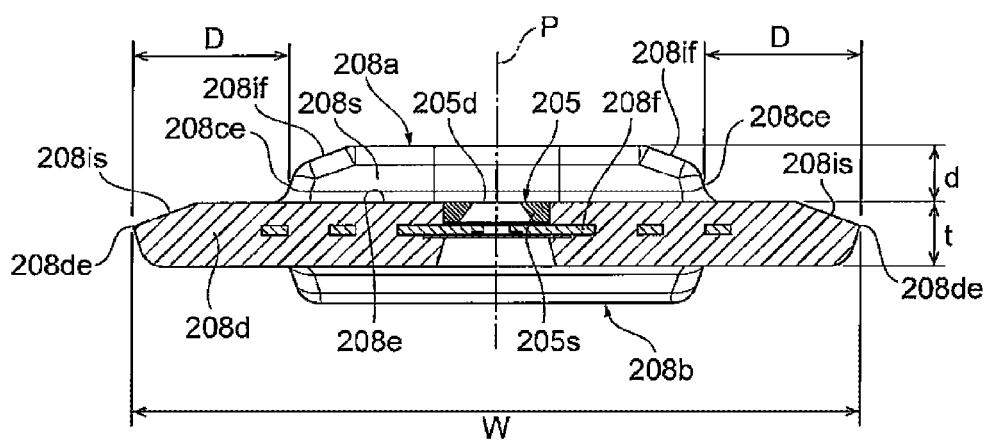
FIG. 18B is a cross-sectional view of the chip package taken along line XVIII(B)-XVIII(B) in FIG. 18A.
Figure 18C:
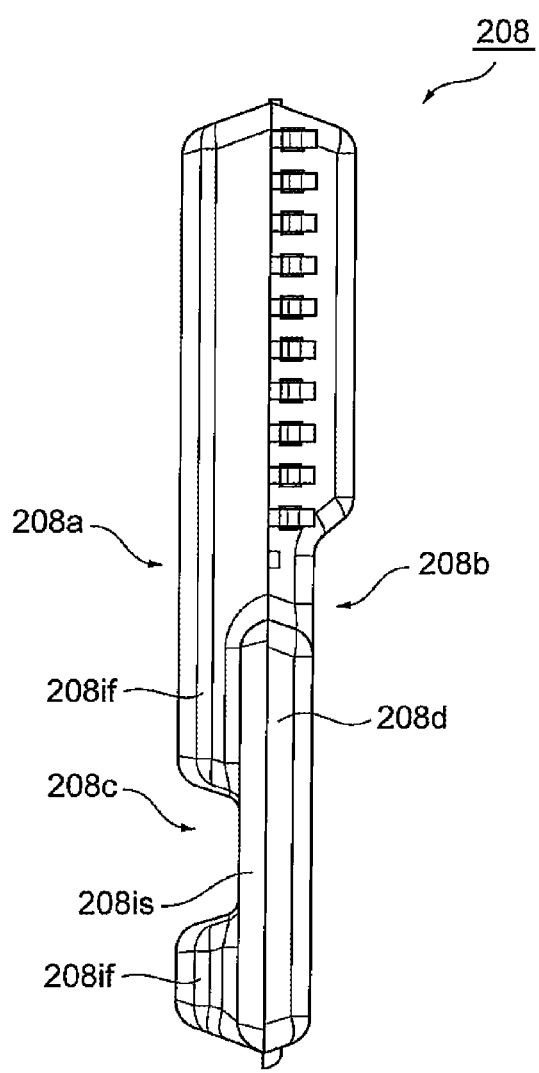
FIG. 18C is a side view of the chip package illustrated in FIG. 18A.

FIG. 18A is a front view illustrating a fourteenth modification of the chip package 208 in FIG. 4A. FIG. 18B is a cross-sectional view of the chip package 208 taken along line XVIII(B)-XVIII(B) in FIG. 18A. FIG. 18C is a side view of the chip package illustrated in FIG. 18A.

The physical quantity detection device 20 according to a fourteenth modification includes the chip package 208 illustrated in FIGS. 18A to 18C. The chip package 208 includes a first inclined portion 208if and a second inclined portion 208is. The first inclined portion 208if is inclined such that the depth d of the accelerating flow path 208c becomes shallower toward both ends in the width direction Dw on the measurement surface 208a. Further, the second inclined portion 208is is inclined so as to reduce the thickness t of the separation flow portion 208d toward both ends in the width direction Dw on the measurement surface 208a. The physical quantity detection device 20 including the chip package 208 of the fourteenth modification can also achieve the same effect as the physical quantity detection device 20 including the chip package 208 illustrated in FIGS. 4A and 4B.

As described above, according to this embodiment, it is possible to provide the physical quantity detection device 20 capable of improving the noise performance of the flow rate detection unit 205 as compared with the related art.

As described above, the embodiment of the physical quantity detection device according to the disclosure has been described in detail with reference to the drawings. However, the specific configuration is not limited to this embodiment, and there are design changes and the like without departing from the gist of the disclosure, which are also included in the disclosure.

REFERENCE SIGNS LIST 2 measurement target gas
20 physical quantity detection device
205 flow rate detection unit
208 chip package
208a measurement surface
208b non-measurement surface
208c accelerating flow path
208ce end portion
208d separation flow portion
208de end portion
208e bottom wall portion
208i inclined surface
208ib inclined surface
208ie inclined bottom surface
208if first inclined portion
208is second inclined portion
208s side wall portion
234b second sub-passage (flow path)
d depth
Dw width direction
G gap R recess
t thickness
W width

The invention claimed is:

1. A physical quantity detection device comprising:
a plate-shaped chip package that is arranged to protrude from a wall surface of a flow path of a measurement target gas and has a width along a flow direction of the measurement target gas, wherein
the chip package includes a flow rate detection unit, an accelerating flow path having a cross-sectional area narrower than a cross-sectional area of the flow path and in which the flow rate detection unit is arranged, a measurement surface provided with the accelerating flow path, a non-measurement surface opposite to the measurement surface, and a separation flow portion that partitions the flow path into a measurement flow path facing the measurement surface and a non-measurement flow path facing the non-measurement surface,
an end portion of the accelerating flow path and an end portion of the separation flow portion are separated from each other in a width direction of the chip package, and
the one end portion of the accelerating flow path and the one end portion of the separation flow portion are separated from each other in the width direction, and the other end portion of the accelerating flow path and the other end portion of the separation flow portion coincide with each other.

2. The physical quantity detection device according to claim 1, wherein
the chip package has inclined surfaces on both sides of the measurement surface in the width direction,
the inclined surface is inclined so as to approach the non-measurement surface as approaching an edge of the chip package in the width direction,
the accelerating flow path includes a pair of side wall portions extending along the width direction so as to face a protruding direction of the chip package, and a bottom wall portion between the pair of side wall portions, and
the bottom wall portion has an inclined bottom surface inclined so as to approach the non-measurement surface as approaching the end portion of the accelerating flow path coinciding with the end portion of the separation flow portion.

3. The physical quantity detection device according to claim 2, wherein the chip package has an inclined surface along the inclined bottom surface on the non-measurement surface opposite to the inclined bottom surface.

4. A physical quantity detection device comprising:
a plate-shaped chip package that is arranged to protrude from a wall surface of a flow path of a measurement target gas and has a width along a flow direction of the measurement target gas, wherein
the chip package includes a flow rate detection unit, an accelerating flow path having a cross-sectional area narrower than a cross-sectional area of the flow path and in which the flow rate detection unit is arranged, a measurement surface provided with the accelerating flow path, a non-measurement surface opposite to the measurement surface, and a separation flow portion that partitions the flow path into a measurement flow path facing the measurement surface and a non-measurement flow path facing the non-measurement surface,
an end portion of the accelerating flow path and an end portion of the separation flow portion are separated from each other in a width direction of the chip package,
both end portions of the accelerating flow path and both end portions of the separation flow portion are separated in the width direction,
both the end portions of the accelerating flow path are located inside both the end portions of the separation flow portion in the width direction,
the accelerating flow path has a pair of side wall portions extending along the width direction so as to face a protruding direction of the chip package, and
a length of one of the side wall portions is longer than a length of the other side wall portion in the width direction.

5. The physical quantity detection device according to claim 4, wherein a distal end portion in a protruding direction of the chip package has a tapered shape in which a dimension in the width direction decreases as approaching the distal end.

6. The physical quantity detection device according to claim 4, wherein
the chip package has inclined surfaces on both sides of the measurement surface in the width direction, and
the inclined surface is inclined so as to approach the measurement surface as approaching an edge of the chip package in the width direction.

7. The physical quantity detection device according to claim 4, wherein
the chip package includes a first inclined portion and a second inclined portion,
the first inclined portion is inclined so as to decrease the depth of the accelerating flow path toward both ends in the width direction on the measurement surface, and
the second inclined portion is inclined such that a thickness of the separation flow portion becomes thinner toward both ends in the width direction on the measurement surface.

8. A physical quantity detection device comprising:
a plate-shaped chip package that is arranged to protrude from a wall surface of a flow path of a measurement target gas and has a width along a flow direction of the measurement target gas, wherein
the chip package includes a flow rate detection unit, an accelerating flow path having a cross-sectional area narrower than a cross-sectional area of the flow path and in which the flow rate detection unit is arranged, a measurement surface provided with the accelerating flow path, a non-measurement surface opposite to the measurement surface, and a separation flow portion that partitions the flow path into a measurement flow path facing the measurement surface and a non-measurement flow path facing the non-measurement surface,
an end portion of the accelerating flow path and an end portion of the separation flow portion are separated from each other in a width direction of the chip package,
both end portions of the accelerating flow path and both end portions of the separation flow portion are separated in the width direction,
the accelerating flow path has a pair of side wall portions extending along the width direction so as to face a protruding direction of the chip package, one side wall portion is provided on a wall surface of the flow path, and a gap is provided between the one side wall portion and a distal end portion of the chip package.

9. The physical quantity detection device according to claim 8, wherein both the end portions of the accelerating flow path are located outside both the end portions of the separation flow portion in the width direction.

10. The physical quantity detection device according to claim 8, wherein the one side wall portion and a distal end portion of the chip package face each other in a thickness direction of the chip package.

11. A physical quantity detection device comprising:
a plate-shaped chip package that is arranged to protrude from a wall surface of a flow path of a measurement target gas and has a width along a flow direction of the measurement target gas, wherein
the chip package includes a flow rate detection unit, an accelerating flow path having a cross-sectional area narrower than a cross-sectional area of the flow path and in which the flow rate detection unit is arranged, a measurement surface provided with the accelerating flow path, a non-measurement surface opposite to the measurement surface, and a separation flow portion that partitions the flow path into a measurement flow path facing the measurement surface and a non-measurement flow path facing the non-measurement surface,
an end portion of the accelerating flow path and an end portion of the separation flow portion are separated from each other in a width direction of the chip package,
both end portions of the accelerating flow path and both end portions of the separation flow portion are separated in the width direction,
both the end portions of the accelerating flow path are located inside both the end portions of the separation flow portion in the width direction,
the accelerating flow path has a pair of side wall portions extending along the width direction so as to face a protruding direction of the chip package,
one side wall portion is a wall surface of the flow path, and
a distal end portion of the chip package has a gap between the distal end portion and the one side wall portion, and has an inclined surface inclined so as to approach the non-measurement surface as approaching the one side wall portion.

12. The physical quantity detection device according to claim 11, wherein the distal end portion of the chip package is accommodated in a recess provided in the flow path.

* * * * *